(12) United States Patent
Brock et al.

(10) Patent No.: US 9,342,670 B2
(45) Date of Patent: *May 17, 2016

(54) CONTENT MONITORING AND HOST COMPLIANCE EVALUATION

(71) Applicant: Attributor Corporation, San Mateo, CA (US)

(72) Inventors: James L. Brock, Redwood City, CA (US); James E. Pitkow, Redwood City, CA (US)

(73) Assignee: Attributor Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,124

(22) Filed: May 27, 2014

(65) Prior Publication Data

US 2015/0074748 A1  Mar. 12, 2015

Related U.S. Application Data

(63) Continuation of application No. 11/512,067, filed on Aug. 29, 2006, now Pat. No. 8,738,749.

(51) Int. Cl.
*G06F 13/30* (2006.01)
*G06F 21/10* (2013.01)
*H04L 29/06* (2006.01)

(52) U.S. Cl.
CPC .............. *G06F 21/105* (2013.01); *G06F 21/10* (2013.01); *H04L 63/20* (2013.01); *G06F 2221/0737* (2013.01); *G06F 2221/2101* (2013.01); *G06F 2221/2105* (2013.01)

(58) Field of Classification Search
CPC ... H04L 67/327; H04L 51/12; H04L 63/0263; H04L 63/10; G06F 17/30905; G06F 21/10; G06F 17/3089; G06F 21/105
USPC ......... 709/223, 217–219, 224–226, 230–232, 709/238, 303; 704/4, 6, 9; 705/50–59, 64, 705/74
See application file for complete search history.

(56) References Cited

U.S. PATENT DOCUMENTS 5,629,980 A  5/1997 Stefik
5,634,012 A  5/1997 Stefik et al.
(Continued)

FOREIGN PATENT DOCUMENTS

WO  WO0211033  2/2002
WO  WO02006578  8/2002
(Continued)

OTHER PUBLICATIONS

Allamanche et al. "Content-Based Identification of Audio Material Using Mpeg-7 Low Level Description," in Proc. of the Int. Symp. of Music Information Retrieval, Indiana, USA, Oct. 2001.
(Continued)

*Primary Examiner* — Ruolei Zong
(74) *Attorney, Agent, or Firm* — Attributor Corporation

(57) ABSTRACT

Evaluating content is disclosed. Evaluating includes determining a host policy associated with one or more host policy rules, wherein the host policy specifies one or more conditions under which the content may be hosted, automatically assessing compliance with the one or more host policy rules based at least in part on a context associated with the use of the content, and combining the compliance assessments to make a compliance evaluation.

25 Claims, 12 Drawing Sheets

(56) References Cited

U.S. PATENT DOCUMENTS

| | | | |
|---|---|---|---|
| 5,715,403 A * | 2/1998 | Stefik | 705/44 |
| 5,910,987 A | 6/1999 | Ginter | |
| 5,913,205 A | 6/1999 | Jain et al. | |
| 5,918,223 A | 6/1999 | Blum et al. | |
| 6,035,055 A | 3/2000 | Wang et al. | |
| 6,121,530 A | 9/2000 | Sonada | |
| 6,236,971 B1 | 5/2001 | Stefik | |
| 6,466,695 B1 | 10/2002 | Potzsch et al. | |
| 6,563,950 B1 | 5/2003 | Wiskott et al. | |
| 6,574,609 B1 | 6/2003 | Downs | |
| 6,647,548 B1 | 11/2003 | Lu | |
| 6,684,254 B1 | 1/2004 | Dutta | |
| 6,693,236 B1 | 2/2004 | Gould et al. | |
| 6,829,368 B2 | 12/2004 | Meyer et al. | |
| 6,834,308 B1 | 12/2004 | Ikezoye | |
| 6,871,200 B2 | 3/2005 | MacQueen et al. | |
| 6,889,383 B1 | 5/2005 | Jarman | |
| 6,898,799 B1 | 5/2005 | Jarman | |
| 6,952,769 B1 * | 10/2005 | Dubey et al. | 713/153 |
| 6,983,371 B1 | 1/2006 | Hurtado et al. | |
| 7,003,131 B2 | 2/2006 | Watson et al. | |
| 7,043,473 B1 | 5/2006 | Rassool et al. | |
| 7,047,241 B1 | 5/2006 | Erickson | |
| 7,113,615 B2 | 9/2006 | Rhoads | |
| 7,185,201 B2 | 2/2007 | Rhoads | |
| 7,194,490 B2 | 3/2007 | Zee | |
| 7,266,704 B2 | 9/2007 | Levy | |
| 7,298,864 B2 | 11/2007 | Jones | |
| 7,346,472 B1 | 3/2008 | Moskowitz et al. | |
| 7,363,278 B2 | 4/2008 | Schmelzer et al. | |
| 7,366,787 B2 | 4/2008 | Salas et al. | |
| 7,369,677 B2 | 5/2008 | Petrovic et al. | |
| 7,370,017 B1 | 5/2008 | Lindeman et al. | |
| 7,376,976 B2 * | 5/2008 | Fierstein et al. | 726/27 |
| 7,421,723 B2 | 9/2008 | Harkness | |
| 7,444,403 B1 * | 10/2008 | Packer et al. | 709/224 |
| 7,529,659 B2 | 5/2009 | Wold | |
| 7,653,552 B2 | 1/2010 | Vaidyanathan et al. | |
| 7,681,032 B2 | 3/2010 | Peled et al. | |
| 7,730,316 B1 | 6/2010 | Baccash | |
| 7,831,531 B1 | 11/2010 | Baluja et al. | |
| 8,010,511 B2 | 8/2011 | Brock et al. | |
| 8,090,717 B1 | 1/2012 | Bharat et al. | |
| 8,341,412 B2 | 12/2012 | Conwell | |
| 8,458,482 B2 | 6/2013 | Conwell | |
| 8,688,999 B2 | 4/2014 | Conwell | |
| 8,707,459 B2 | 4/2014 | Brock et al. | |
| 8,738,749 B2 | 5/2014 | Brock et al. | |
| 8,868,917 B2 | 10/2014 | Conwell | |
| 8,935,745 B2 | 1/2015 | Brock et al. | |
| 9,031,919 B2 | 5/2015 | Brock et al. | |
| 2002/0028000 A1 | 3/2002 | Conwell et al. | |
| 2002/0038296 A1 | 3/2002 | Margolus et al. | |
| 2002/0048369 A1 | 4/2002 | Ginter et al. | |
| 2002/0052885 A1 | 5/2002 | Levy | |
| 2002/0069370 A1 | 6/2002 | Mack | |
| 2002/0082731 A1 | 6/2002 | Pitman et al. | |
| 2002/0082999 A1 | 6/2002 | Lee et al. | |
| 2002/0087885 A1 | 7/2002 | Peled et al. | |
| 2002/0152215 A1 | 10/2002 | Clark et al. | |
| 2002/0168082 A1 | 11/2002 | Razdan | |
| 2002/0174132 A1 | 11/2002 | Silverman | |
| 2002/0178271 A1 | 11/2002 | Graham et al. | |
| 2002/0178410 A1 | 11/2002 | Haitsma et al. | |
| 2003/0021441 A1 | 1/2003 | Levy | |
| 2003/0037010 A1 | 2/2003 | Schmelzer | |
| 2003/0061490 A1 | 3/2003 | Abajian | |
| 2003/0086341 A1 | 5/2003 | Wells et al. | |
| 2003/0093790 A1 | 5/2003 | Logan et al. | |
| 2003/0101104 A1 | 5/2003 | Dimitrova et al. | |
| 2004/0010602 A1 | 1/2004 | Van Vleck et al. | |
| 2004/0054661 A1 * | 3/2004 | Cheung et al. | 707/3 |
| 2004/0107166 A1 | 6/2004 | Stefik et al. | |
| 2004/0163106 A1 | 8/2004 | Schrempp et al. | |
| 2004/0225645 A1 | 11/2004 | Rowney | |
| 2004/0243567 A1 | 12/2004 | Levy | |
| 2004/0255147 A1 | 12/2004 | Peled et al. | |
| 2004/0267552 A1 | 12/2004 | Gilliam et al. | |
| 2005/0008225 A1 | 1/2005 | Yanagisawa et al. | |
| 2005/0043548 A1 | 2/2005 | Cates | |
| 2005/0043960 A1 | 2/2005 | Blankley | |
| 2005/0080846 A1 | 4/2005 | McCleskey et al. | |
| 2005/0102515 A1 | 5/2005 | Jaworski et al. | |
| 2005/0125358 A1 | 6/2005 | Levin | |
| 2005/0141707 A1 | 6/2005 | Haitsma | |
| 2005/0154678 A1 | 7/2005 | Schmelzer | |
| 2005/0193016 A1 | 9/2005 | Seet et al. | |
| 2005/0213790 A1 * | 9/2005 | Rhoads et al. | 382/100 |
| 2005/0222900 A1 | 10/2005 | Fuloria et al. | |
| 2005/0246752 A1 | 11/2005 | Liwerant et al. | |
| 2005/0259819 A1 | 11/2005 | Oomen et al. | |
| 2005/0273612 A1 | 12/2005 | Van Der Veen et al. | |
| 2006/0031870 A1 | 2/2006 | Jarman et al. | |
| 2006/0034177 A1 | 2/2006 | Schrempp | |
| 2006/0075237 A1 | 4/2006 | Seo | |
| 2006/0080356 A1 | 4/2006 | Burges et al. | |
| 2006/0085816 A1 | 4/2006 | Funk et al. | |
| 2006/0115108 A1 | 6/2006 | Rodriguez | |
| 2006/0174348 A1 | 8/2006 | Rhoads | |
| 2006/0177198 A1 | 8/2006 | Jarman et al. | |
| 2006/0218126 A1 | 9/2006 | De Ruijter | |
| 2006/0240862 A1 | 10/2006 | Neven | |
| 2006/0277564 A1 | 12/2006 | Jarman | |
| 2007/0061393 A1 | 3/2007 | Moore | |
| 2007/0094145 A1 | 4/2007 | Ta et al. | |
| 2007/0101360 A1 | 5/2007 | Gutta et al. | |
| 2007/0124756 A1 | 5/2007 | Covell et al. | |
| 2007/0130177 A1 | 6/2007 | Schneider | |
| 2007/0162761 A1 | 7/2007 | Davis | |
| 2007/0168543 A1 | 7/2007 | Krikorian et al. | |
| 2007/0180537 A1 | 8/2007 | He et al. | |
| 2007/0208711 A1 | 9/2007 | Rhoads | |
| 2007/0211174 A1 | 9/2007 | Putterman et al. | |
| 2007/0220575 A1 | 9/2007 | Cooper | |
| 2007/0234213 A1 | 10/2007 | Krikorian et al. | |
| 2007/0242880 A1 | 10/2007 | Stebbings | |
| 2007/0253594 A1 | 11/2007 | Lunt | |
| 2007/0294173 A1 * | 12/2007 | Levy et al. | 705/51 |
| 2008/0002854 A1 | 1/2008 | Tehranchi et al. | |
| 2008/0005241 A1 | 1/2008 | Cohen | |
| 2008/0027931 A1 | 1/2008 | Lu | |
| 2008/0052783 A1 | 2/2008 | Levy | |
| 2008/0059211 A1 | 3/2008 | Brock et al. | |
| 2008/0059425 A1 | 3/2008 | Brock et al. | |
| 2008/0059461 A1 | 3/2008 | Brock et al. | |
| 2008/0059536 A1 | 3/2008 | Brock | |
| 2008/0082405 A1 | 4/2008 | Martinez et al. | |
| 2008/0109369 A1 | 5/2008 | Su | |
| 2008/0152146 A1 | 6/2008 | Conrado et al. | |
| 2008/0154739 A1 | 6/2008 | Kalaboukis | |
| 2008/0162228 A1 | 7/2008 | Mechbach | |
| 2008/0178302 A1 | 7/2008 | Brock | |
| 2008/0209502 A1 | 8/2008 | Seidel | |
| 2008/0240490 A1 | 10/2008 | Finkelstein | |
| 2008/0249961 A1 | 10/2008 | Harkness | |
| 2009/0006225 A1 | 1/2009 | Multerer | |
| 2009/0052784 A1 | 2/2009 | Covell et al. | |
| 2009/0083228 A1 | 3/2009 | Shatz et al. | |
| 2009/0119169 A1 | 5/2009 | Chandratillake | |
| 2009/0129755 A1 | 5/2009 | Rakib | |
| 2009/0144325 A1 | 6/2009 | Chastagnol | |
| 2009/0144772 A1 | 6/2009 | Fink | |
| 2009/0165031 A1 | 6/2009 | Li | |
| 2010/0017487 A1 | 1/2010 | Patinkin | |
| 2012/0011105 A1 | 1/2012 | Brock et al. | |
| 2012/0284803 A1 | 11/2012 | Wang et al. | |
| 2013/0006946 A1 | 1/2013 | Prahlad et al. | |
| 2013/0022333 A1 | 1/2013 | Takahashi | |
| 2013/0085825 A1 | 4/2013 | Davis et al. | |
| 2014/0020116 A1 | 1/2014 | Chastagnol et al. | |
| 2015/0074833 A1 | 3/2015 | Brock et al. | |

(56) References Cited

U.S. PATENT DOCUMENTS

FOREIGN PATENT DOCUMENTS

| WO | WO02103968 | 12/2002 |
|---|---|---|
| WO | WO2009100093 | 8/2009 |

OTHER PUBLICATIONS

Baluja et al, Content Fingerprinting Using Wavelets, 3rd European Conference on Visual Media Production, Nov. 2006.
Batlle et al., "Automatic Song Identification in Noisy Broadcast Audio," in Proc. of the SIP, Aug. 2002.
Boutin, Crowdsourcing, Consumers as Creators, Business Week, Jul. 13, 2006.
Brin, et al., "Copy Detection Mechanisms for Digital Documents," SIGMOD '95, Proceedings of the 1995 ACM SIGMOD international conference on Management of data, pp. 398-409, 1995.
Cano et al, "A Review of Audio Fingerprinting," Journal of VLSI Signal Processing, 41, 271, 272, 2005.
Covell et al, Advertisement Detection and Replacement using Acoustic and Visual Repetition, IEEE Int'l Workshop on Multimedia Signal Processing, Oct. 2006.
Ghias, et al., "Query by Humming: Musical Information Retrieval in an Audio Database," ACM Multimedia, pp. 231-236, Nov. 1995.
Haitsma, et al, "A Highly Robust Audio Fingerprinting System," Proc. Intl Conf on Music Information Retrieval, 2002.
Heintze, "Scalable Document Fingerprinting (Extended Abstract)," Bell Laboratories, 1996.
Kageyama et al, "Melody Retrieval with Humming," Proceedings of Int. Computer Music Conference (ICMC), 1993.
Kalker et al, "Robust Identification of Audio Using Watermarking and Fingerprinting," in Multimedia Security Handbook, CRC Press, 2005.
Konstantinou, et al., "A Dynamic JAVA-Based Intelligent Interface for Online Image Database Searches," VISUAL'99, LNCS 1614, pp. 211-220, 1999.
Liu et al, U.S. Appl. No. 60/856,501, filed Nov. 3, 2006, entitled "Rights Management" (which serves as a priority application for published US application 20080109369).
Manber, "Finding Similar Files in a Large File System," Jan. 1994 Winter USENIX Technical Conference, 10 pages (as submitted Oct. 1993).
von Ahn, Human Computation, CMU PhD Thesis, Dec. 7, 2005, 87pp.
Wold et al., "Content-Based Classification, Search and Retrieval of Audio," IEEE MultiMedia 1996.
Cheung, et al, Efficient Video Similarity Measurement with Video Signature, IEEE Trans. on Circuits and Systems for Video Technology, 13.1, pp. 59-74, 2003.
Hoad, et al, Methods for Identifying Versioned and Plagiarized Documents, Journal of the American Society for Information Science and Technology, 54.3, pp. 203-215, 2003.
Ke, et al, Efficient Near-Duplicate Detection and Sub-Image Retrieval, Intel Research Report IRP-TR-04-03, 2004.
Popescu, et al, Exposing Digital Forgeries in Color Filter Array Interpolated Images, IEEE Trans. on Signal Processing 53.10, pp. 3948-3959, 2005.
Brin, et al, Copy detection mechanisms for digital documents, ACM SIGMOD Record, vol. 24, No. 2, 1995.
Jul. 3, 2014 Notice of Appeal, Jan. 3, 2014 final Office Action, and Dec. 3, 2013 Amendment; all from assignee's U.S. Appl. No. 13/686,541 (published as 2013-0085825).
U.S. Appl. No. 60/823,066, filed Aug. 21, 2006.
Assignee's U.S. Appl. No. 13/937,995, filed Jul. 9, 2013.
Final Rejection in U.S. Appl. No. 11/512,075.
Assignee's U.S. Appl. No. 14/258,633, filed Apr. 22, 2014.

* cited by examiner

400

Attributor

Greg56@yahoo.com
Home | Matches | My Content | My Account | Help | Sign Out
| Content Manager | Add Content |

Add Content

My content
This is a required entry.
Please tell us the location of your content. If your content has a feed associated with it (e.g., an RSS feed for a blog), please enter the URL for the feed.

- ⦿ Enter the URL for your content or upload files.
  - www.mysite.com
  - Does your content require a username and password to access it? Yes
- ○ Automatically add all of your content at any of the following services:
  - Choose... ▼   Enter User ID for this service: ____

Amount of content
This is a required entry.
We'll include all existing content and automatically get any additions and changes you make to content.

- ⦿ Entire website under this URL (including subdirectories)
- ○ This URL (or feed) only

Nickname ____

Folder
Choose the folder in which you'd like this content placed. Select from the menu of folders you've already created, or create a new folder.

- ⦿ Use a folder you've already created
  - Select a folder... ▼
- ○ Create a new folder
  - ____

Rules of use
This is a required entry.
Choose the rules under which
someone can re-use your content.

- ⊙ Make My Own Rules  Learn more
  - ⊙ (By:)  Attribution Required
  - ○ (By̷)  Attribution Not Required
  - ○ ($)  Commercial Use OK
  - ○ ($%)  Commercial Use OK if user shares [     ] % of the revenue generated from products and services that use my content
  - ⊙ (⊘$)  No Commercial Use
  - ☑ (%)  Limit text copied to [ 20% ▼ ] or less of the Source
  - ☑ (=)  No Changes may be made to my content
  - ☐ (OK)  Contact me first for permission
  - ☐ (↻)  Share alike
- ○ (CC) Creative Commons License  [ Select License... ▼ ]
- ○ (©) All Rights Reserved
- ○ (PD) Public Domain

FIG. 4B

Showing: All Matches ▼  Sort by: Similarity Score ▼

502 —

Controlled | Match
Camera 1 | Camera 2 www.example1.com
Similarity Score: 98
Non-Compliance Score: 88

Controlled | Match
Text 1 | Text 2 www.example2.com
Similarity Score: 78
Non-Compliance Score: 87

— 504

Controlled | Match
Camera 3 | Camera 4 www.example3.com
Similarity Score: 92
Non-Compliance Score: 81

Controlled | Match
Text 3 | Text 4 www.example4.com
Similarity Score: 76
Non-Compliance Score: 98

Add Additional Controlled Content

Controlled Content: [      ]
Email Address: [      ]

[ Add Content ]

FIG. 5

CONTENT MONITORING AND HOST COMPLIANCE EVALUATION

RELATED APPLICATION DATA

This application is a continuation of U.S. patent application Ser. No. 11/512,067, filed Aug. 29, 2006 (now U.S. Pat. No. 8,738,749) which is incorporated herein by reference.

BACKGROUND OF THE INVENTION

Content, such as text, images, and video, may be stored and displayed on the Internet. For example, an online service provider (OSP), such as Google or YouTube, may display images as a result of a text based image search or video posted by users. There are many cases in which content on the Internet is being used in a non-compliant way. Non-compliant content may include material that violates third party copyrights or trademarks, is illegal (e.g., child pornography), or otherwise does not comply with a content owner's terms of use or with an OSP policy. Examples of potentially non-compliant use of content include bloggers copying text from news reports, eBay sellers copying other seller's listing content, aggregators republishing listing from other sites, spammers using copyrighted text to create web pages to influence search results and generate advertising revenue, or even innocent/accidental use of non-compliant content by a conscientious consumer.

Content on the Internet is difficult to monitor for compliance. Typically, a content owner manually monitors the Internet for copies of the owner's content through repetitive queries in search engines like Google. In some cases, the use of the owner's content is permissible under their own license terms or under legal principles such as the copyright concept of "fair use," which considers such factors as whether attribution has been provided, what portion of the content that has been used without permission, and whether the content has been used for commercial purposes (such as generating advertising or subscription revenue). Content owners have no automated methods to evaluate the context in which their content is used by others.

Even when non-compliant use of content is detected, typically it is difficult to remedy. In the case of copyright non-compliance, the content owner's objective usually is to cause the content to be removed from third-party services that host the content or search engines which refer users to it through their indices. This typically is a manual process which involves submitting a notice under the Digital Millennium Copyright Act (DMCA). The DMCA provides OSPs and search engines with a safe harbor from copyright infringement liability if they promptly remove content from their service upon request by the content owner. Therefore, when a content owner finds a copy of his content, he can choose to send a take down notice under DMCA by writing a letter or an email to the OSP or search engine. In response, the OSP or search engine typically must manually remove the content from their service to avoid liability.

From an OSP's perspective, monitoring for content that does not comply with the OSP's host policy is also typically a manual process. When OSPs monitor content as it is uploaded, typically a human views and approves content before (or after) it is displayed and non-compliant content is rejected (or removed). OSPs also must manually review and compare content when they receive DMCA notices, and often have little information to determine if content is out of compliance and no automated way to determine the identity or reputation of the complaining party. As the amount of content on the Internet grows, manual content monitoring and enforcement processes are becoming increasingly impractical. Therefore, improved methods for monitoring content and managing enforcement of non-compliant content are needed.

BRIEF DESCRIPTION OF THE DRAWINGS

Various embodiments of the invention are disclosed in the following detailed description and the accompanying drawings.

FIG. 4A is an example of a GUI for providing controlled content.

FIG. 4B is an example of a GUI for providing usage rules.

FIG. 5 is an example of a GUI for displaying search results.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
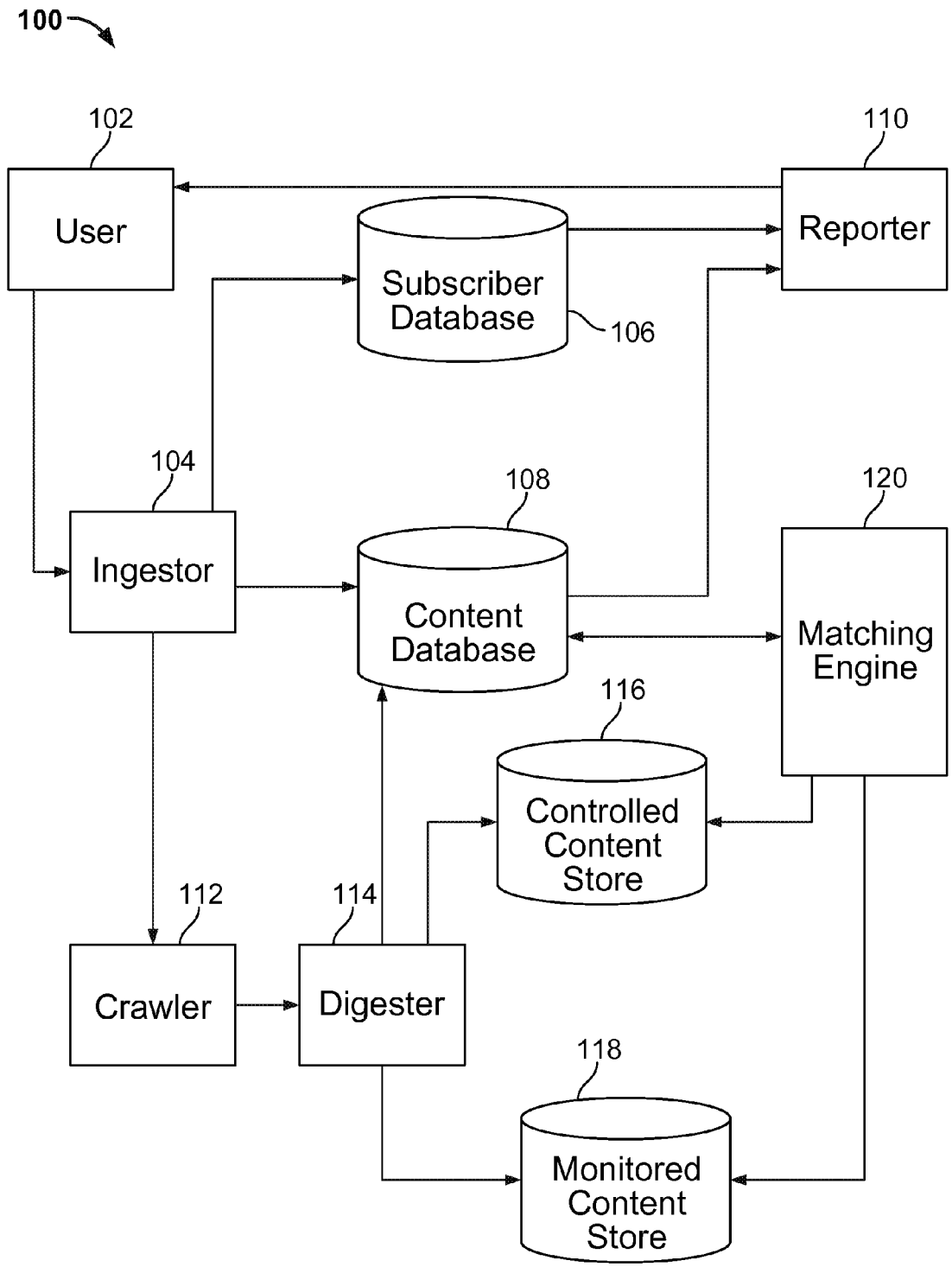
FIG. 1 is a block diagram illustrating an embodiment of a content monitoring system.

FIG. 1 is a block diagram illustrating an embodiment of a content monitoring system. In some embodiments, content monitoring system 100 is used by a content owner to monitor for non-compliant use of the content owner's content based on usage rules specified by the content owner. Examples of content owners include: a photographer (e.g., Ansel Adams), a film studio (e.g., Disney), or a columnist (e.g., Walter Mossberg). The content owner is not necessarily the same as the content creator. Usage rules (including usage policies, terms of use, usage terms, etc.) are a set of rules regarding conditions under which content may be used, as specified by the content owner. Usage rules may vary depending on the content and/or the content owner and applicable law (such as "fair use"). Usage rules are more fully described below.

In some embodiments, content monitoring system 100 is used by a content host to monitor for non-compliant use of content based on a host policy specified by the content host. A content host refers to an entity that hosts, serves, stores, provides, and/or displays content. Examples of content hosts include OSPs, such as search engines (e.g., Google), photo or video sharing websites (e.g., YouTube, Yahoo), and blogging sites (e.g., TypePad). As used herein, an OSP is an entity that hosts and/or serves or provides content on behalf of itself or other entities. For example, an OSP includes an OSP as defined under DMCA. An OSP includes an electronic content management system (ECM). A host policy is a set of rules regarding conditions under which content may be hosted, as specified by a content host. A host policy may vary depending on the content host. As an example of a host policy, OSPs may have policies that apply to the posting of content by their users, in which they reserve the right to remove content or users in the event of non-compliance (determined at their discretion). In some embodiments, a configurable host policy governs the automatic handling of DMCA notices, as more fully described below.

A content user is an entity that uses content that is not owned by the content user. A content user includes an entity that owns or posts content. Examples of content users include writers, photographers, bloggers, or any user who posts content on content hosts.

Controlled content refers to content associated with one or more compliance rules, where compliance rules include usage rules specified by a content owner and/or host policy rules specified by a content host. In the case where a content owner is monitoring for use of his content, controlled content is the content owner's content. In the case where a content host is monitoring for non-compliant content, controlled content is content that is non-compliant with the host policy. Monitored content refers to the set of content being searched (i.e., potential matches). In other words, content monitoring system 100 searches monitored content for use of controlled content. As used herein, a match, copy, or use of controlled content does not necessarily refer to an identical match, an identical copy, or use of identical content. A match, copy, or use of controlled content is identified based on criteria such as similarity scores and non-compliance scores, as more fully described below.

Compliant content refers to content that satisfies usage rules associated with the content. In the case where a content host such as an OSP is monitoring for non-compliant content, compliant content refers to content that not only satisfies the usage rules, but also satisfies the host policy of the content host (e.g., the OSP).

As used herein, a unit of content may be referred to as a content object. Content objects can include any object type. Examples of content objects include a text document, an image, video, audio, flash, animation, game, lyrics, code, or portions thereof (e.g., a phrase/sentence/paragraph, a subimage, or a video clip). Other examples include a single file (e.g., an image), all of the text on a web page (e.g., a news article), a chapter in a book, and a blog entry. The content object may be in various audio, image, or video formats, such as MP3, JPEG, MPEG, etc.

Content monitoring system 100 can be used to find copies of a set of content at a given point in time or regularly monitor for matches. Content monitoring system 100 may be used to monitor data associated with the Internet or any other appropriate environment in which there is a need to monitor content for compliance. Examples of appropriate environments include the Internet, an Intranet, a firewalled network, a private network, an Electronic Data Interchange (EDI) network, an ad hoc network, etc.

As shown, user 102 provides input to ingestor 104. Ingestor 104 provides input to subscriber database 105, content database 108, and crawler 112. Reporter 110 receives input from subscriber database 105 and content database 108. Crawler 112 provides input to digester 114. Digester 114 provides input to content database 108, controlled content store 116, and monitored content store 118. Matching engine 120 provides input to controlled content store 116 and monitored content store 118. Content database 108 interacts with matching engine 120.

Content ingestor 104 accepts controlled content from user 102. User 102 includes content owners or administrators of content monitoring system 100. The content may be specified in various ways. A user interface (UI) may be provided for user 102 to specify content. In some embodiments, the UI provides an interface for uploading content or specifying a link/set of links to the content, where the links may be local (e.g., on a local hard drive) or remote (e.g., on a remote server or on the Internet). An example of a remote link is a user's eBay account. User 102 may display, in his eBay store, images to be monitored. For example, user 102 is a photographer selling his photography. Using the UI, user 102 specifies a URL to the eBay store or particular auction. In some embodiments, instead of providing a URL to a particular auction, the content owner provides their username (such as an eBay seller ID), which allows the system to retrieve all of the user-posted content associated with that username, which could be associated with one or more auctions. In some embodiments, the content owner also provides a password if necessary or expedient to locate user-posted content. In some embodiments, a schedule for fetching content may be specified. For example, crawler 112 may be configured to fetch images from the user's eBay store every 24 hours. The raw content is passed to digester 114 for processing and storage.

In some embodiments, the ingesting of content is automatically triggered by content creation. For example, when a blogger posts a new entry, it is automatically ingested. When a writer updates a Word document, the content is automatically ingested.

In some embodiments, if the URL or username provided by the content owner contains some content of third parties, the user is presented with a means to exclude or include specific content objects (such as a single image) from monitoring and from the content owner's usage rules.

The controlled content may be from the Internet or from another source. A manual or automated API may be used to ingest content or perform any of the other processes described herein. A URL or any other appropriate identifier may be used to specify content. Credentials associated with accessing the content, such as a password, may be provided.

Besides controlled content, other data may be provided as input to content monitoring system 100, such as links (e.g., URLs or websites) identified by an administrator, content host, or content owner. These sites may have been identified because the user is aware of a specific instance of non-compliance at that location, they have historically posted non-compliant content or are of particular concern to the user. Other examples of additional data that may be input to content monitoring system 100 are more fully described below.

Crawler 112 fetches content from the network. The content to be fetched may include the Internet, a subset of the Internet, a complete domain, or a single piece of content from the web. Identifiers may be used to identify the content to be fetched. Some examples of identifiers include: a URL, a directory, a password protected website(s), all items for a seller on eBay, and all content of a given type or format (e.g., images only or JPEGs only). In some embodiments, crawler 112 is used with modules that provide different rules for crawling. In some embodiments, crawler 112 fetches content according to a specified schedule.

Controlled content store 116 includes controlled content. In some embodiments, controlled content store 116 includes the following information: a copy of the content, an index of fingerprints associated with the content, and metadata about the content (e.g., filename, URL, fetch date, etc.). In some embodiments, the copy of the content is stored in a separate cache. A fingerprint includes a signature of an object that can be used to detect a copy of an object as a whole or in part. A content object may have more than one fingerprint. A fingerprint may be associated with more than one content object. A fingerprint may be associated with a whole or part of a content object. A fingerprint may be multidimensional. For example, there may be multiple features associated with a fingerprint. A fingerprint may contain multiple fingerprints or subfingerprints.

Monitored content store 118 is a repository for crawled data. Monitored content store 118 may include any digital object collection or environment. In some embodiments, monitored content store 118 is a web store. In some embodiments, there are multiple content stores, e.g., one for each kind of data—text, images, audio, video, etc. In some embodiments, monitored content store 118 includes data from sites that copy the most often, and is updated most frequently. This data may be indicated as such (i.e., tagged or flagged as common copier) or stored separately. In some embodiments, a real-time store (not shown) is used to store various feeds coming in (e.g., from a content owner's blog each time the blog is updated, or from a content owner's eBay store every 24 hours). In some embodiments, a ping server or similar server is used to update feeds coming in. If the feeds contain links, the content is fetched by crawler 112. Over time, data moves from the real-time store to monitored content store 118 as it becomes older. Monitored content store 118 changes periodically, whereas the real-time store keeps changing as content comes in. In some embodiments, external stores (not shown), such as search engines, are accessed using application programming interfaces (APIs). Once data is fetched, they are stored in monitored content store 118. Some embodiments of this are more fully described below. In some embodiments, fingerprints of content are stored in monitored content store 118. In some embodiments, Gigablast is used to fetch and store content data.

Digester 114 receives content fetched by crawler 112, including controlled content or monitored content, analyzes, and processes it. Analysis of content is more fully described below. The content and associated metadata is stored in controlled content store 116 or monitored content store 118, as described above.

In some embodiments, matching engine 120 finds matches to controlled content by comparing controlled content from controlled content store 116 with monitored content from monitored content store 118 based on matching techniques including technical factors, compliance factors, and other factors, as more fully detailed below.

Reporter 110 reports match results to user 102 or an administrator of content monitoring system 100. Various user interfaces may be used. Examples of reporting and UIs for reporting results are more fully described below.

Subscriber database 106 contains information about customers. Content database 108 contains references to controlled content and to matched content corresponding to the controlled content. In some embodiments, a separate database is used for matched content.

In some embodiments, content monitoring system 100 is used as a content clearinghouse by content users wishing to use content. Before using a particular content object (i.e., unit of content), the content user checks with content monitoring system 100 to determine whether the conditions under which the content user wishes to the use the content complies with the usage policy set by the content owner.

Content monitoring system 100 may be implemented in various ways in various embodiments. For example, controlled content, web data, subscriber data, and/or content data may be organized and stored in one or more databases. Ingesting, crawling, digesting, matching, and/or reporting may be performed using one or more processing engines.

In some embodiments, any of the functions provided by content monitoring system 100, such as ingesting, crawling, digesting, matching, and reporting, may be provided as a web service. For example, content monitoring system 100 or an element of content monitoring system 100 is queried and provides information via XML.

Figure 2A:
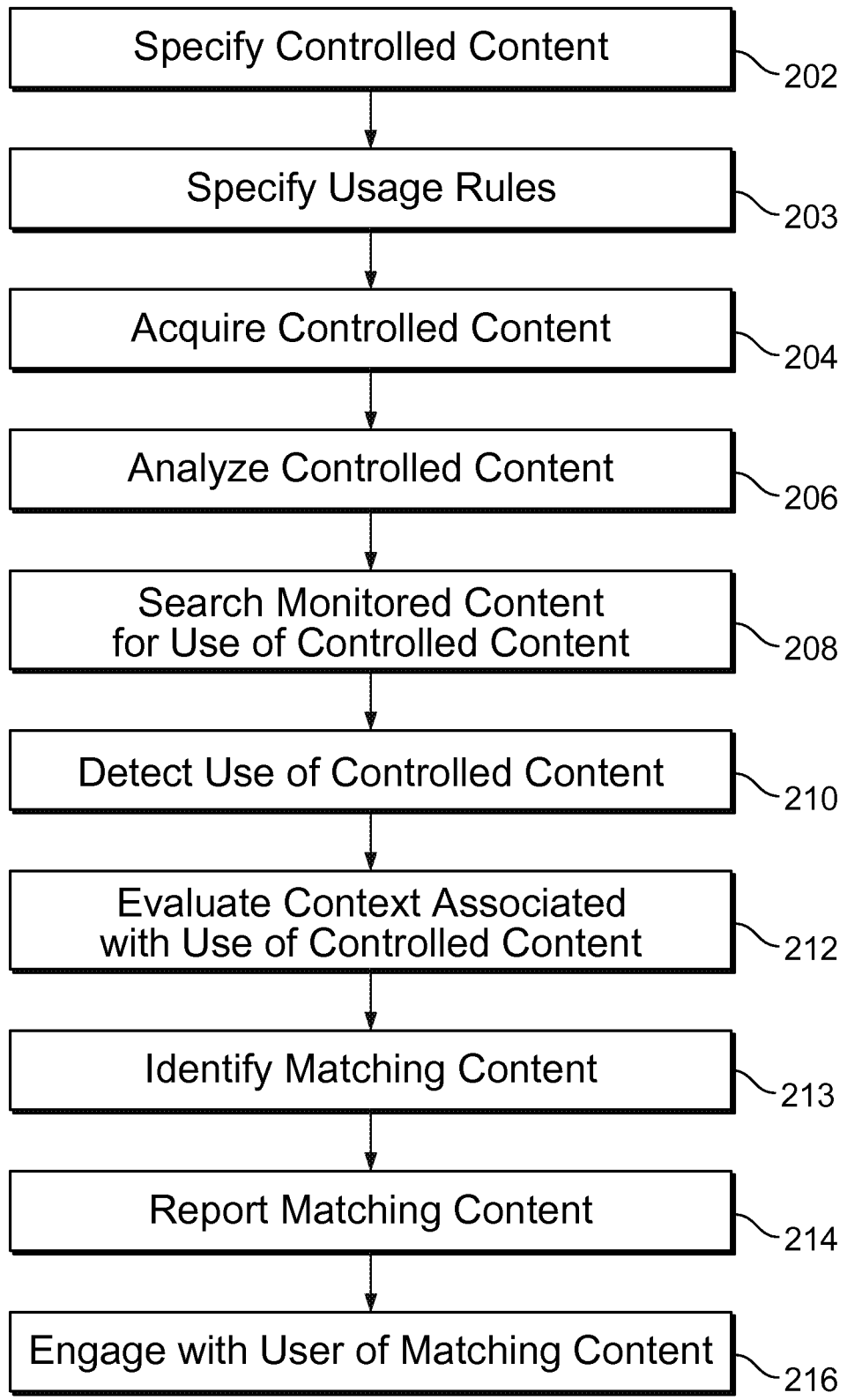
FIG. 2A is a flow chart illustrating an embodiment of a process for monitoring content.

FIG. 2A is a flow chart illustrating an embodiment of a process for monitoring content. In some embodiments, this process is performed when a content owner is searching or monitoring for non-compliant use of the his controlled content. In some embodiments, this process is performed by content monitoring system 100.

In the example shown, the process begins at 202, and controlled content is specified. Controlled content may include text, images, video, or any other type of data. Controlled content may be specified in various ways, such as content located in a particular directory and/or all content contributed by a particular user (e.g., on eBay). A user (e.g., a content owner or an administrator) may specify controlled content using any appropriate interface. Examples of graphical user interfaces are described more fully below. The user may also request a one time search or regular monitoring for the controlled content. In the case of the latter, the user may specify options related to regular monitoring, such as frequency of monitoring, how often reports should be received, etc.

At 203, usage rules are specified. Usage rules include conditions under which a content owner permits the use of owned content. Usage rules may include terms under which a content owner permits the republication and/or modification of content. Usage rules may include different conditions depending on whether the use is for commercial or non-commercial uses, business or education uses, with or without attribution, in a limited amount, in a limited context, etc. The usage rules may be based on any appropriate compliance structure, such as "fair use," "copy left," "share alike," Creative Commons specified structures, user specific compliance rules, rules against associating the controlled content with objectionable content (e.g., obscenity, adult content, child pornography), rules requiring attribution, moral rights, rights of personality, or any legal or personal compliance structure. A usage rule may take into account editorial context. In other words, certain uses may be permitted that are not permitted in another context. For example, if the controlled content object is a book, portions from the book may be permitted to be used in a book review but not in another context (where other rules may apply).

A variety of user interfaces may be used to specify usage rules. For example, a list of terms, checkboxes (to apply a rule), and settings (specific to a rule) may be provided. The list may include, for example: whether attribution is required, amount of duplication allowed, whether commercial use is allowed, whether changes are allowed, whether permission is required, whether derivative content is allowed, geographical requirements, whether the owner requires advertisement revenue sharing (e.g., using Google AdSense) and associated terms and information, etc. The usage rules may be hierarchical. For example, a list of higher level rules or compliance structures may be displayed for selection, each of which may be expanded to display lower level rules that each of the high level rules comprises. Usage rules may have any number of levels. Checkboxes (or another appropriate object) may be located next to the higher level or lower level rules and may be selected (e.g., checked off) at any level of granularity. For example, selecting checkboxes next to a higher level rule automatically selects all corresponding lower level rules. Alternatively, lower level rules may be individually selected. An example of a higher level rule is a particular type of license. Lower level rules under the license include the specific usage rules associated with the license.

Usage rules may be customized for each content owner (and for each content object). In some embodiments, a unique URL is provided to the content owner for his use (e.g., to include as a link associated with an icon placed in proximity to his content on his website, in his eBay store, etc.) When a content user wishes to use content on the content owner's website, the content user can then select the link, which leads to a page describing the content owner's usage rules (for that content object).

In some embodiments, rather than providing a unique URL to the content owner, the content owner could use a particular URL on his website or web page. For example, the particular URL could be "rules.attributor.com." When a content user wishes to use content on the content owner's website, the content user can select the link, which leads to a page describing the content owner's usage rules (for the website or content on the website). In this case, the content monitoring system determines from which website the link was selected and can determine which usage rules to display. In some embodiments, the same URL is common to multiple content owner's websites. Further examples are discussed below.

Usage rules may be stored in the content monitoring system. For example, the usage rules for content owners may be stored in controlled content store 116 (e.g., as metadata associated with the content object) or in subscriber database 106.

At 204, controlled content is acquired. In some embodiments, 204 is performed by ingestor 104 in system 100. In various embodiments, controlled content is obtained from a source specified at 202. For example, controlled content is obtained from a particular directory or from one or more servers containing content contributed by a particular user. Controlled content acquisition may be automated or non-automated. For example, an automated process could poll for updates and acquire controlled content when an update is detected. In some embodiments, a ping server is used to detect updates. In some embodiments, controlled content is continuously acquired or ingested. For example, if the controlled content is specified as all content contributed by a particular user on eBay, then when the user contributes new content to eBay, that content is automatically acquired or acquired at configured times or time intervals. A variety of APIs may be used to acquire controlled content. In some embodiments, after controlled content is acquired, the user is given an opportunity to confirm that it is the correct controlled content or the controlled content the user intended. The acquisition of controlled content may involve any network, protocol (e.g., UDP, TCP/IP), firewall, etc.

At 206, controlled content is analyzed. In some embodiments, 206 is performed by digester 114 in system 100. In some embodiments, the acquired content is analyzed for unique identifying features. Any appropriate technique may be used to extract features from the content. For example, a fingerprint associated with the content may be determined. The technique may depend on the media type (e.g., spectral analysis for audio/video, histogram or wavelets for images/video, etc.) For example, in the case of text content, various techniques may be used, such as unique phrase extraction, word histograms, text fingerprinting, etc. An example is described in T. Hoad and J. Zobel, "Methods for identifying versioned and plagiarized documents," in Journal of the American Society for Information Science and Technology, Volume 54, Issue 3, 2003. In the case of image content, various techniques may be used, including key point identification, color histograms, texture extraction, image signatures, or extraction of any other feature. An example is described in Y. Ke, R. Sukthankar, and L. Houston, "Efficient near-duplicate detection and sub-image retrieval," in ACM Multimedia. ACM, October 2004, pp. 1150-1157. In the case of video content, a video fingerprinting technique may be used. In another example, a signature is formed for each clip by selecting a small number of its frames that are most similar to a set of random seed images, as further described in S.-C. Cheung, A. Zakhor, "Efficient Video Similarity Measurement with Video Signature," Submitted to IEEE Trans. on CSVT, January, 2002. In the case of audio content, an audio fingerprinting technology may be used. For example, a spectral signature is obtained and used as input to a hash function. In various embodiments, other techniques may be used. Analyzing may include determining spectral data, wavelet, key point identification, or feature extraction associated with the controlled content. In some embodiments, results from the analysis are stored in controlled content store 116 in system 100.

At 208, monitored content is searched for use of controlled content. In some embodiments, monitored content is specified by a user, such as a content owner or administrator. The entire web may be searched, or a subset of the web (e.g., websites that have been identified as sites that copy the most often or data in a content store such as monitored content store 118). A database of sites that have been crawled and resulting data may be maintained that is updated at various times. Rather than searching the entire web, the database may be used instead. Searching may comprise a combination of searching the web and consulting a database of previously crawled websites. In some embodiments, monitored content store 118 in system 100 stores previously crawled websites. In some embodiments, 208 is performed by crawler 112 in system 100.

Searching may be performed in one or more stages, each stage refining the search further. For example, a first search may yield a first set of candidate content objects. A second search searches the first set of candidate content objects to yield a second set of content objects, and so forth. Eventually, the final set of content object(s) includes the content object(s) that match or most closely match the controlled content object. In some embodiments, less expensive and/or less complex techniques may be used to obtain candidate sets followed by one or more tighter, smaller granularity techniques to progressively enhance the resolution of the analysis. Which techniques may be used and in which order may be determined based on cost and/or complexity. In some embodiments, the second search comprises a manual search. For example, the second set of content objects may be a smaller set and may be searched by a human.

In some embodiments, a hash structure is used to obtain a candidate set of content objects. For example, a hash table is maintained such that similar content objects are hashed to the same or a nearby location in a hash table. This way, to search for content object A, a hash function associated with A is computed and looked up in a hash table, and a set of objects that are similar to A is obtained. A hash function associated with a content object may be computed in various ways. The hash function may be computed differently depending on the type of content object or one or more characteristics of the content object. For example, if the content object is a text document, a fingerprinting technique specific to text may be used to obtain a fingerprint of the document. The fingerprint may be input to the hash function to obtain a hash value that corresponds to a group of other content objects that have a similar fingerprint. Hash values that are nearby in the hash table correspond to content objects that have similar (though less similar than those in the same hash bin) fingerprints, to create a clustering effect. In this way, a candidate set of content objects may be obtained.

Other techniques such as cosine similarity, latent semantic indexing, keyword based methods, etc., may also be used.

In some embodiments, existing search engines or search facilities on websites, such as eBay, are used to obtain a candidate set of documents. This approach may be useful in an initial implementation of the system. For example, APIs provided by Google or other search engines may be used to perform this search. For example, to search for a document, a unique phrase within the document is selected. The unique phrase is input to a Google search using a Google API and the results are a candidate set of documents. Multimedia search engines (e.g., video, image) may be used to obtain a candidate set of documents. In the case of images, an image search engine may be used to obtain a candidate set of images. For example, Riya (www.Riya.com) includes an image search engine that may be used to obtain a candidate set.

In some embodiments, besides the Internet, databases may be searched using these techniques. Some examples of databases include Factiva, Corbis, and Hoover's. Although these databases do not allow indexing of their documents, they do have a search interface. This search interface may be used to perform searches for content using unique phrase extraction. For example, articles in the Factiva database containing a unique phrase from a controlled content object are more likely to be a match. A subsequent search may be performed by obtaining the full text of the articles and searching them using more refined techniques. Searching this way limits having to crawl the entire Internet. Also the more computationally intensive search techniques are limited to a smaller search space.

In some embodiments, once a candidate set of content objects is obtained, one or more refining searches are performed. For example, the candidate set of documents are crawled and advanced matching techniques can be applied to the candidate set of documents. A variety of content or document similarity techniques may be used. For example, the techniques described at 206 may be used on the candidate set of content objects.

In the case of text documents, a refining search may comprise computing a signature for each paragraph or other data set. A Levinstein distance could be used to determine the similarity between a document and the controlled content object. A byte by byte comparison could be used. Other techniques, such as anchoring or cosine similarity may be used, as described more fully in T. Hoad and J. Zobel, "Methods for identifying versioned and plagiarized documents," in Journal of the American Society for Information Science and Technology, Volume 54, Issue 3, 2003. Techniques such as PCA-sift or feature extraction of color, texture and signature generation may be used. For example, A. C. Popescu and H. Farid, "Exposing Digital Forgeries by Detecting Duplicated Image Regions, Technical Report, TR2004-515, Dartmouth College, Computer Science describes examples of such techniques.

In the case of images, images may be subsampled to be robust against cropping and subimage reuse using techniques such as key pointing (or key point extraction), which looks for unique signatures within a portion of an image, such as edges or extreme color gradations, and samples these portions to obtain a signature. Another way is to subsample distinctive portions of a color histogram of the image.

In some embodiments, different techniques are used depending on characteristics of the content object. For example, if a document has fewer than 20 paragraphs, a byte by byte comparison may be used. If a document has 20 or more paragraphs, a different technique may be used. Sampling and anchoring points may depend on the format of the document.

At 210, use of controlled content is detected. In some embodiments, 210-213 are performed by matching engine 110 in system 100. In some embodiments, detection is based on various criteria associated with technical factors that may result from searching at 208. An example of a technical factor is a similarity score. A similarity score is a measure of the similarity between two content objects and may be computed in a variety of ways. For example, the Levinstein distance is a similarity score. In some embodiments, if similarity scores meet one or more criteria, use of controlled content is detected. The criteria may be configurable by the user or administrator. One or more similarity scores may be computed for a controlled object and candidate object to represent various characteristics of the content. In some embodiments, one or more similarity scores may be weighted and combined into a single similarity score.

A similarity score may account for various degrees of copying. For example, the first and last paragraph of a document may be copied, a portion of a document may be copied, or the whole document may be copied. Different samples of music may be copied into a single audio file. Videos may be mixed from copied videos. One controlled document may have 15 samples, one or more of which may be copied. A similarity score may account for these factors. For example, a copying extent score may be used to indicate the percentage of a controlled content object that has been copied. A copying density score may be used to indicate the percentage of a match that is comprised of a controlled content object.

At 212, a context associated with the use of the controlled content is evaluated. The context refers to any attribute associated with the use of the content object. For example, the context includes compliance factors, technical factors, and reputation information. Context may be automatically and/or manually determined.

Compliance factors are based on usage rules specified by content owners. For example, compliance factors include information related to attribution and commercial context. Examples of compliance factors include whether the site is government, education, commercial, revenue producing, subscription based, advertising supported, or produces revenue in some other way (e.g., using a reputation bartering scheme associated with a compensation mechanism). This can be determined manually or automatically. For example, a human could review the website, or based on the top level domain (e.g., .edu, .com, .org), or the presence of advertising related HTML code, it can be determined whether the website is commercial.

In some embodiments, a non-compliance score is computed to represent the likelihood that a content object is non-compliant based on the compliance factors. In some embodiments, multiple compliance factors are used to determine a non-compliance score. For example, the non-compliance score takes multiple compliance factors, normalizes and weighs each one as appropriate, and takes the sum. In some embodiments, the weighting is based on usage rules and/or host policy rules. In addition an overall weight may be used to scale the non-compliance score. For example, content found on educational sites may be weighted differently. One or more non-compliance scores may be computed.

Besides technical factors and compliance factors, examples of other factors include reputation information. For example, a reputation database is maintained that includes reputation ratings of content users by other content owners. For example, Bob's blog may have a low reputation because it has posted numerous copyrighted content objects owned by others who have given Bob's blog a low reputation rating.

At 213, matching content (i.e., match content object(s)) is identified based on detection at 210 and/or evaluation at 212. As previously described, a match, copy, or use of controlled content does not necessarily refer to an identical match, an identical copy, or use of identical content.

In some embodiments, a match is a technical match and is selected based only on technical factors, such as similarity scores. In this case, technical matches are identified at 210, and at 212, the technical matches are evaluated based on context to determine whether they are compliant.

In other embodiments, a match is selected based on configurable criteria associated with technical factors (e.g., similarity scores), compliance factors (e.g., non-compliance scores), and/or other factors (e.g., reputation information). In some embodiments, it is determined that content objects with one or more similarity scores that exceed a similarity score threshold and one or more non-compliance scores that exceed a non-compliance score threshold are matches. In other words, a content object that is technically similar, but is compliant with applicable usage rules, would not be considered a match. In some embodiments, it is determined that any content object with one or more similarity scores that exceed a similarity score threshold is a match.

In some embodiments, a binary flagging is used. For example, it is determined that content objects with one or more similarity scores that exceed a similarity score threshold and/or one or more non-compliance scores that exceed a non-compliance score threshold are "interesting" and other content objects are "non-interesting." In some embodiments, "interesting" content objects are reported to the user at 214.

At 214, content is reported to the user (e.g., content owner). In some embodiments, which content to report is configurable and may depend on criteria based on technical factors (e.g., similarity scores), compliance factors (e.g., non-compliance scores), and/or other factors (e.g., reputation information). In some embodiments, matching content as identified at 213 is reported to the user. In some embodiments, a user views and manually confirms whether each matching content object is non-compliant. The results may be stored in a common database.

In some embodiments, 214 is performed by reporter 110 in system 100. Various interfaces could be used. Screenshots, links, buttons, tabs, etc. may be organized in any appropriate fashion. In some embodiments, a user interface is presented to the user that shows the matching content, one or more similarity scores, and one or more non-compliance scores. Example interfaces for reporting results are more fully described below.

In some embodiments, the interface provides a way for the user to confirm that content is the user's content or reject the content (i.e., indicate a false positive). This data may be fed back into the monitoring process. For example, this information may be stored in a database or with the content metadata. In some embodiments, the interface provides choices of actions for the user to select from (e.g., ask that the reusing party attributes it, offer license/licensing terms, remove under DMCA, etc.).

In some embodiments, 214 is not performed and the process continues at 216.

At 216, the user of the content is engaged. In some embodiments, user contact information is obtained from the IP address, the U.S. Copyright Office (e.g., a designated agent registered with the U.S. Copyright Office), or a known email address (e.g., of an OSP or a user of an OSP). A database or lookup table of contact information associated with various sites may be maintained and used to determine user contact information.

Depending on configuration settings, various types of communication may be sent to the content user. For example, a DMCA notice, information concerning usage rules, licensing information, etc. may be sent. For example, the content owner may have specified one or more usage rules associated with his content, such as "do not license any content," "replace content with an advertisement," "add watermark to content," "add Unicode overlay," "share advertisement revenue," or "ask permission prior to use." Based on the usage rules, an appropriate communication may be sent to the content user. In some embodiments, the content user is also configured to use the content monitoring system. The content user may have specified a set of compliance rules, such as "automatically debit my account up to $100 per year when licensed content is used," "offer to share advertising revenue when contacted by content owner," "remove content when contacted by content owner," etc. Based on the compliance rules, an appropriate response may be sent back to the content owner. In some embodiments, an engagement communication may be configured to be sent in a way that preserves the anonymity of the sender of the engagement communication (e.g., the content owner, or a content host, as more fully described below).

An example of an engagement communication includes an email that is automatically sent to a content user notifying the user that the content is owned and offering to license it for $9.99 per year, and including a link to the content owner's usage rules hosted by the content monitoring system. The content owner may configure his settings so that the email is not sent to content users whose sites are educational or non-profit or those settings may be default settings if the content owner's usage rules indicate free use by educational or non-profit sites. In response, the content user sends a response agreeing to the terms. The response may be created and/or sent automatically because the content user's compliance rules indicate the following rule: "automatically debit my account up to $100 per year when licensed content is used." The response may be sent manually, or the user may approve an automatically created response before it is sent.

In some embodiments, a series of communications may occur between the content user and content owner. On the content user and/or the content owner's side, the responses may be automatic. In this way, licensing terms can be negotiated and/or steps can be taken towards resolution.

In some embodiments, compensation is not necessarily monetary. For example, the content owner may just want to receive attribution, license revenue or advertising revenue sharing may be donated to charitable or other causes as directed by the content owner or may be treated as a credit towards a trade (e.g., if you use my content, I can use your content), or the content owner may require that the content and derivative works be presented in a manner that enables tracking of the number of uses or views of the content, or that derivative works must be available for use by others under specified usage rules.

In some embodiments, whenever new controlled content is provided, processes 202-206 are performed. In some embodiments, every prespecified search interval, processes 208-213 are performed. In some embodiments, every prespecified report interval, 214 is performed. For example, an email may be sent to the user indicating that new matches have been found, and a link to the web interface provided in the email message. In some embodiments, 214 is performed each time a user logs into the content monitoring system. In some embodiments, 208-213 are performed when a user logs into the content monitoring system, either automatically, or after a user selects an "update results" or "search" button upon logging in.

In some embodiments, the number of accesses to a controlled content object is tracked. For example, the content is associated with a web beacon or other element of code that enables the tracking of accesses of the content for purposes such as calculation of license fees or revenue sharing.

Figure 2B:
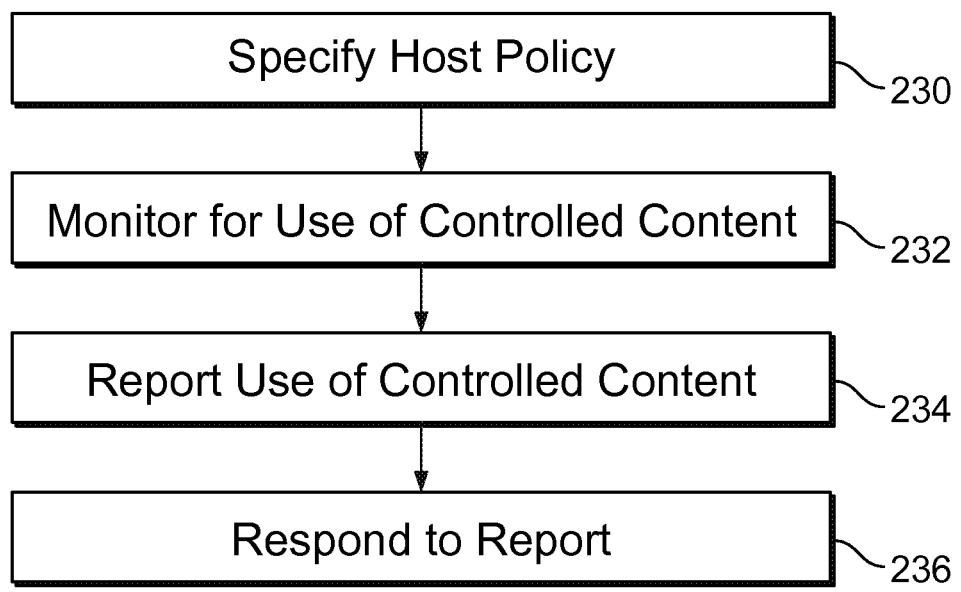
FIG. 2B is a flow chart illustrating an embodiment of a process for monitoring for use of controlled content.

FIG. 2B is a flow chart illustrating an embodiment of a process for monitoring for use of controlled content. In some embodiments, this process is performed when a content host, such as an OSP, is searching or monitoring for non-compliant use of content based on a host policy of the content host. Thus, the controlled content in this case is non-compliant content based on a host policy. In some embodiments, this process is performed by content monitoring system 100.

At 230, a host policy is specified. For example, an OSP may have a policy regarding what comprises non-compliant content. Non-compliant content may include material that violates third party copyrights or trademarks, is illegal (e.g., child pornography) or does not comply with an OSP's terms of service (e.g., adult content, pornography, obscenity). A host policy may include host rules that may be associated with any compliance structure, such as host specific compliance rules, rules against objectionable content (e.g., obscenity, adult content, child pornography), or any legal or personal compliance structure. A host policy may specify that content must comply with usage rules specified by the content owner, such as "copy left," "share alike," Creative Commons specified structures, etc.

A variety of user interfaces may be used to specify a host policy. For example, any of the user interfaces described at 203 for specifying usage rules may be used to specify a host policy. For example, a list of terms, checkboxes (to apply a rule), and settings (specific to a rule) may be provided. The list may include, for example: whether pornography is allowed, whether profanity is allowed, whether to comply with one or more usage rules, whether to comply with copyright or other legal structures, etc. The rules may be hierarchical. For example, a list of higher level rules or compliance structures may be displayed for selection, each of which may be expanded to display lower level rules that each of the high level rules comprises. Rules may have any number of levels. Checkboxes (or another appropriate object) may be located next to the higher level or lower level rules and may be selected (e.g., checked off) at any level of granularity.

At 232, content is monitored for use of controlled content. In this case, the monitored content comprises the content hosted by the content host (e.g., the content served by the OSP). In some embodiments, monitoring comprises checking each content object before it is hosted (or served) by the OSP. For example, an OSP such as youtube.com may check each video before it is made available for viewing on youtube.com. In some embodiments, monitoring comprises periodically checking content objects served by the OSP. For example, a new video is made available for viewing immediately after being posted, but the video may later be removed by a monitoring process that checks new content objects. If the video is determined to be non-compliant, it is removed and the video owner is optionally notified. The results of the check are stored in a database so that the video does not need to be checked again unless it is modified.

In some embodiments, if information obtained from the database is not enough to determine whether the content is compliant, an evaluation is performed, where the evaluation can include techniques described at 212. The evaluation may also include techniques used to detect objects or characteristics of objects in an image, such as faces, body parts, the age of a person being depicted, etc. Such techniques may be useful to detect pornography or child pornography, for example. The evaluation results may then be stored in the database.

Examples of monitoring are more fully described below with respect to FIG. 2D.

In some embodiments, a common pool of objectionable content is maintained based on input from multiple content hosts. For example, the common pool may include content that has been identified by various content hosts as containing pornography, child pornography, profanity, or racial content. Depending on the compliance rules specified in their host policies, an OSP may have an interest in contributing to, sharing, and using the common pool to identify objectionable content and remove or reject it.

For example, an OSP such as eBay may desire to monitor content posted by its users. An eBay employee manually performs simple filtering for adult content. Each time the eBay employee flags an object as "adult content," that object is acquired by the content monitoring system and becomes part of a common pool of objectionable controlled content.

Content in the objectionable database may also be stored with a certainty rating. For example, the greater number of times the content object has been identified as violating a rule, the greater the certainty rating. In some embodiments, for each content object in the objectionable database, data is maintained regarding each usage/compliance rule that it violates. For example, content object 10034 may be non-compliant with rules 4, 7, and 112, but not other rules. This information may be stored in a table, metadata associated with content object 10034, or in any other appropriate way.

In some embodiments, if the content is being monitored for by a user at 202-213, data from that process may be re-used at 232. For example, similarity, compliance, and other factors may be determined based on data already obtained at 202-213. Additional compliance factors that take into account the host policy may also be determined and used.

At 234, content is reported. In some embodiments, which content to report is configurable and may depend on criteria based on technical factors (e.g., similarity scores), compliance factors (e.g., non-compliance scores), and/or other factors (e.g., reputation information) as described at 214. Content reported may include content determined to be non-compliant based on the host policy. Content reported may also include notices received from content owners who believe the content host is using their content in a non-compliant way.

For example, a web interface may be provided for viewing and managing reported content. In some embodiments, the web interface allows the host to track and manage past and/or pending engagement notices. The web interface includes information about matching content, reputation information, similarity scores, non-compliance scores, link(s) to usage rules associated with the content object, and any other appropriate information. Reputation information could be related to the content owner, e.g., how reputable the content owner is. For example, the content owner may not actually be the content owner, but a scam artist or spammer who has sent thousands of notices. On the other hand, a reputable content owner may have only sent 3 notices in the past year. In some embodiments, reputation is based on ratings by other content users, content hosts, and/or other users of the content monitoring system. For example, content users who have dealt with a particular content owner and felt that he was legitimate may have given him good reputation ratings. In some embodiments, APIs to the content monitoring system are provided to the OSP for managing notices and responding.

At 236, the report is responded to. In some embodiments, an automatic response is sent according to rules set by the OSP. For example, whenever the OSP receives a DMCA notice from a content owner with a reputation rating above a specified value, it automatically takes down the image. In another example, whenever a child pornography match is made with a similarity score above 90 and a non-compliance score above 80, an email is sent to the user and if no response is received within a set period of time, the content is removed. In some embodiments, an OSP administrator manually reviews each content match and selects a response for each content match.

Besides a common pool of objectionable content, various common/collaborative pools of data may be maintained. Other examples of common pools of data include reputation of content owners, reputation of content users, reputation of content hosts, content known to be in the public domain, sites known to copy the most often, etc. These common pools may be contributed to by content owners (e.g., end users), content hosts (e.g., an employee on an OSP's content review team), legal experts, experts in "fair use," other reputable entities, results from previous detection results (e.g., false positives), etc. APIs or other interfaces may be provided to assist with flagging content for inclusion in these pools. These common pools of data may then be accessed and used during the monitoring process (e.g., during 202-216 or 231-232).

For example, a negation database be maintained that includes content that is known to be in the public domain, content that has expired or lapsed in copyright, and/or content that is difficult to claim ownership of, e.g., because it is common, such as disclaimers and copyright notices. Any content in the negation database is designated as compliant.

Figure 2C:
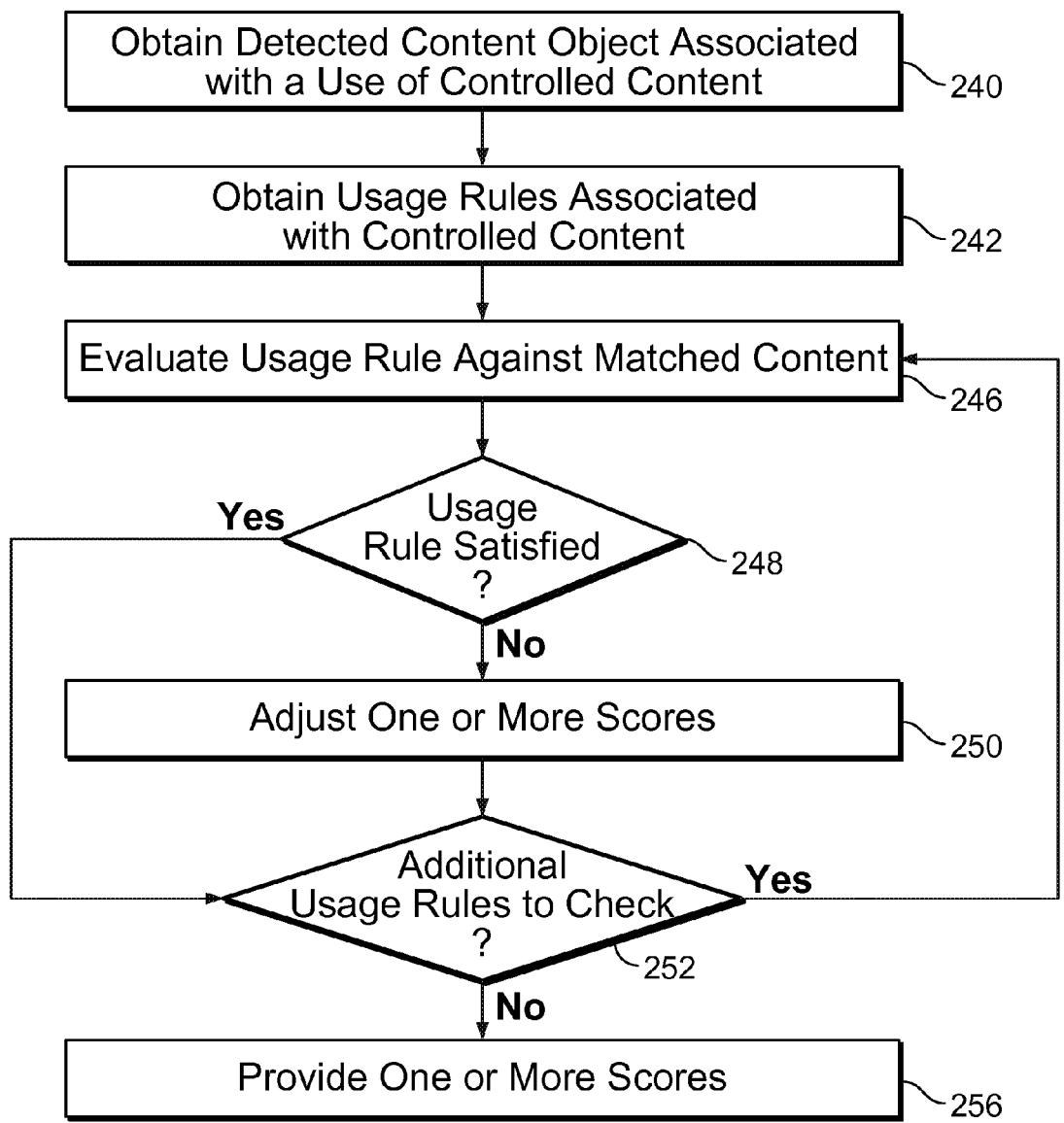
FIG. 2C is a flow chart illustrating an embodiment of a process for evaluating context of a content object.

FIG. 2C is a flow chart illustrating an embodiment of a process for evaluating context of a content object. In some embodiments, this process is used to perform 212 when the context includes compliance information (e.g., compliance factors). Examples of compliance factors include the presence or absence of advertising on a page containing the content object, whether the page contains paid content, etc. In some embodiments, this process is performed by content monitoring system 100. In some embodiments, this process is performed when a content owner is monitoring for use of his content.

At 240, a detected content object associated with use of controlled content is obtained. In some embodiments, the detected content object is detected based on technical factors, as described at 210.

At 242, usage rules associated with the controlled content are obtained. In some embodiments, the usage rules specified by the content owner at 203 are obtained.

At 246, a usage rule is evaluated against the detected content object. The usage rule may be specified at a high level (e.g., do not permit use on for profit sites, permit use on nonprofit sites) or at lower level (e.g., do not permit use on pages containing advertising, offer to license on pages containing paid content, permit use on sites ending with .edu). For example, it is determined whether the page associated with the content object contains advertising, requires a subscription, contains affiliate links, or contains paid content.

At 248, it is determined whether the usage rule is satisfied. If not, one or more scores are adjusted. For example, a non-compliance score may be increased or decreased as appropriate. At 252, it is determined whether there are additional rules to check. If there are additional rules to check, the process returns to 246. If there are no additional rules to check, one or more scores are provided.

Figure 2D:
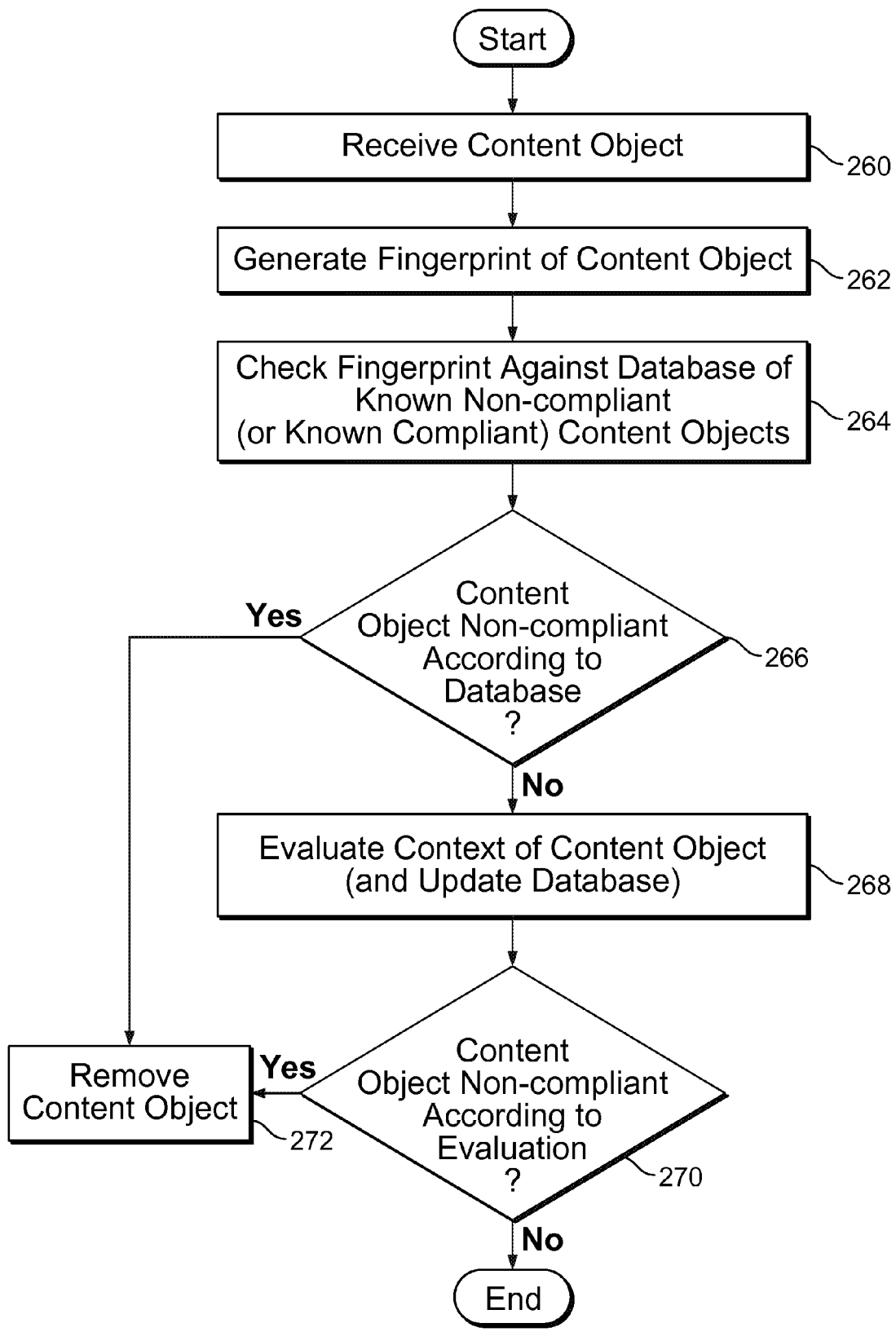
FIG. 2D is a flow chart illustrating an embodiment of a process for monitoring for use of controlled content.

FIG. 2D is a flow chart illustrating an embodiment of a process for monitoring for use of controlled content. In some embodiments, this process is performed by content monitoring system 100. In some embodiments, this process is performed when a content host, such as an OSP, is checking for non-compliant use of controlled content. For example, this process may be used to perform 232.

At 260, a content object is received. For example, a user is posting a new content object to an OSP site, and the OSP is receiving the content object for the first time. At 262, a fingerprint of the content object is generated. A fingerprint may be generated, feature(s) may be extracted, or other analysis performed, as described at 206. At 264, the fingerprint (or another analysis result) is checked against a database of known non-compliant (or known compliant) content objects. In some embodiments, the database includes a common pool of content that has previously been identified either manually or automatically as non-compliant or compliant. The content can be looked up by fingerprint or any other appropriate index. At 266, it is determined whether the content object is non-compliant according to the database. If it is non-compliant according to the database, the content object is removed at 272. If it is not non-compliant according to the database, then the content object is evaluated at 268. (In some embodiments, if the content is compliant according to the database, then the content object is approved for posting.) Evaluating may include any of the processes described at 212-213 and/or at 240-256. In some embodiments, evaluating includes notifying the content host (e.g., the OSP) and receiving an evaluation of the content object from the content host. For example, the content host may perform a manual or automatic evaluation. The results of or data from the evaluation is stored in the database with the fingerprint. At 270, it is determined whether the content object is non-compliant according to the evaluation. For example, the determination can be made based on technical factors, compliance factors, or other factors, as previously described. If the content object is non-compliant, the content object is removed at 272. If not, the process ends. In some embodiments, if the content object is not non-compliant, then the content object is approved for posting.

Figure 2E:
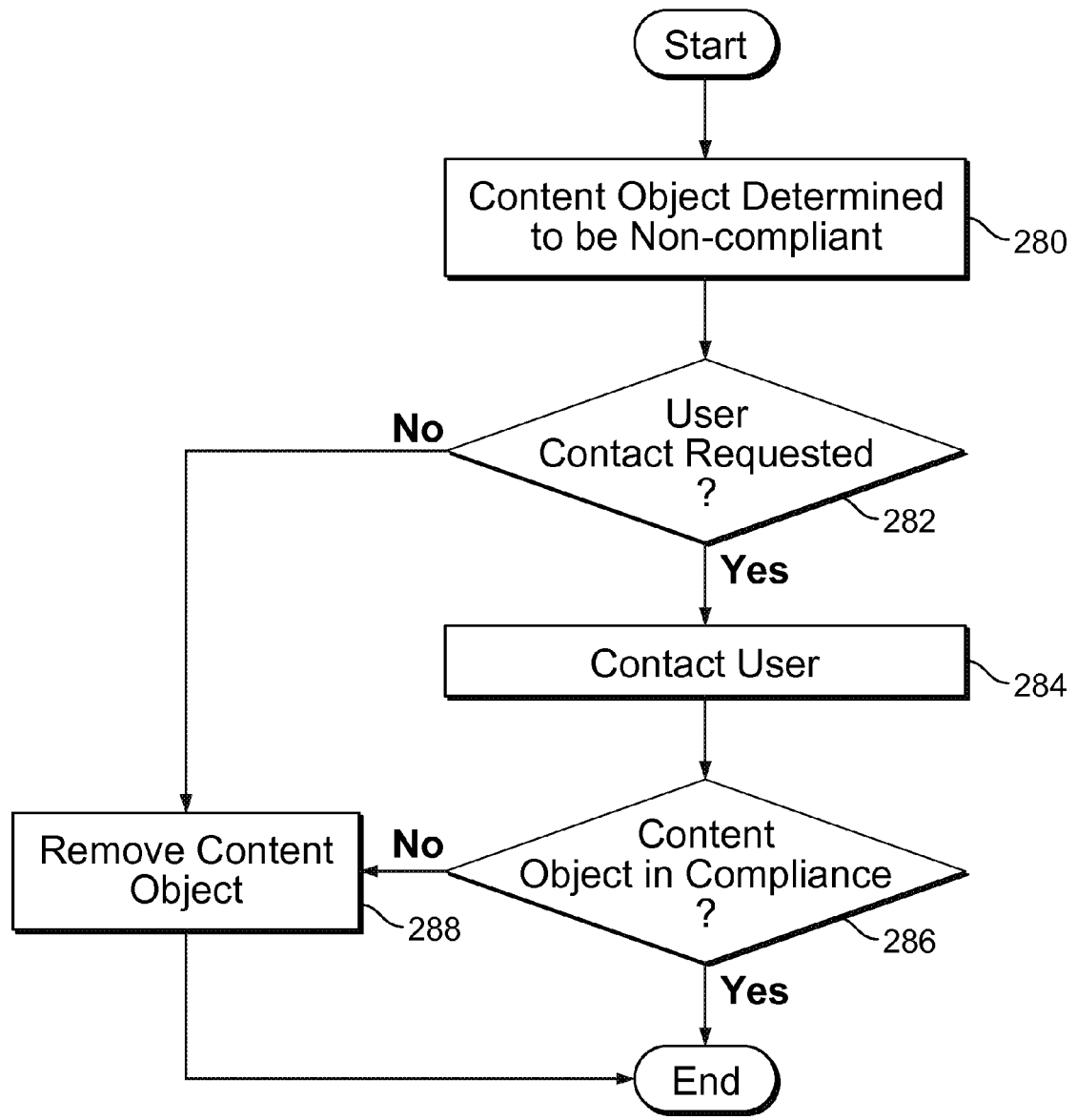
FIG. 2E is a flow chart illustrating an embodiment of a process for engaging with a user of non-compliant content.

FIG. 2E is a flow chart illustrating an embodiment of a process for engaging with a user of non-compliant content. In this example, rather than automatically removing a non-compliant content object, the user may be contacted first. In some embodiments, this process is performed by content monitoring system 100. In some embodiments, this process is used to perform 236 when non-compliant content is found. For example, this process may be performed in place of 272. At 280, a content object is determined to be non-compliant. For example, the determination can be made based on technical factors, compliance factors, or other factors, as previously described. At 282, it is determined whether user contact is requested, which may be a configurable setting. In this example, the user refers to the entity that posted the content on the OSP. If user contact is not requested, then the content object is removed. If user contact is requested, then the user is contacted at 284. For example, the user is notified that the user's content has been identified as non-compliant content and to either take down the content, explain why the content is compliant, or cause the content to be compliant (e.g., based on usage rules for the content). At 286, it is determined whether the content object is in compliance. For example, the user is given a set amount of time to respond, and after that time, an evaluation of whether the content object is in compliance is performed. If it is still not in compliance, the content object is removed. In some embodiments, if it is still not in compliance, the user is notified again, or another appropriate action is taken. If the content object is in compliance, the process ends. In some embodiments, if the content object is now in compliance a database is updated to include this information.

Figure 2F:
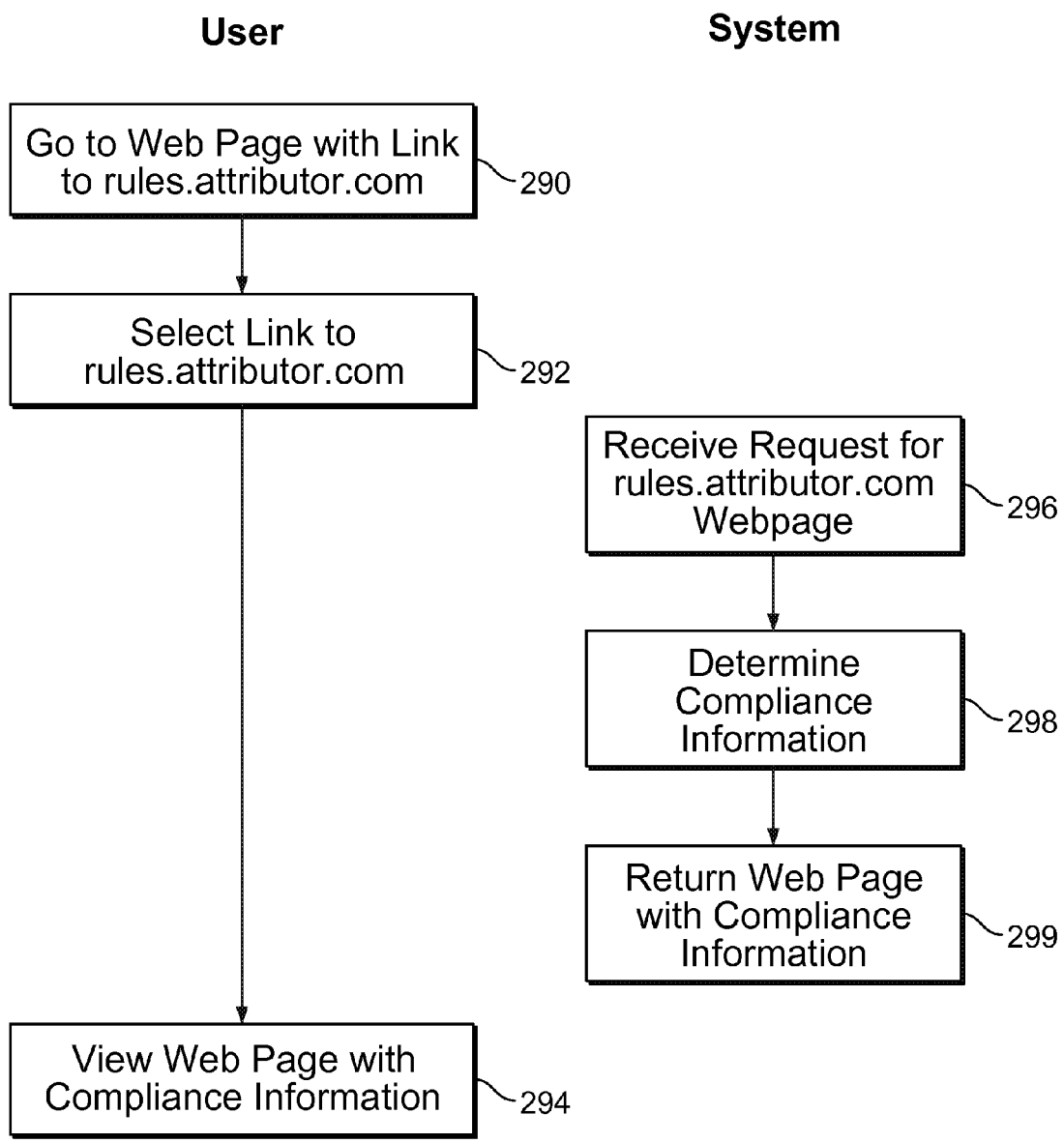
FIG. 2F is a flow chart illustrating an embodiment of a process for displaying compliance information.

FIG. 2F is a flow chart illustrating an embodiment of a process for displaying compliance information (e.g., rules) to a content user wishing to use content on a content owner's website (as described at 203). In this example, a content owner has created a web page of his content (e.g., www.example.com) and included on the web page a link that is associated with a server that stores compliance information associated with his content. In some embodiments, the link is a common URL, where the common URL is not unique to the content owner or his web page (e.g., "rules.attributor.com"). At 290, the web page is viewed, e.g., by a potential content user. At 292, the "rules.attributor.com" link is selected. For example, the content user is interested in using the content, and would like to know if there are any usage rules associated with it.

A receiving system (e.g., a server that stores or has access to the compliance information) receives the request for "rules.attributor.com" at 296 and determines the appropriate compliance information at 298. In some embodiments, the compliance information is determined by looking up the web page from which the link was selected (e.g., the content owner's web page) in a table (or other appropriate structure) of compliance information. For example, next to "www.example.com" in the table are usage rules associated with content on www.example.com. In some embodiments, the table includes information about content objects on the web page and associated usage rules. In some embodiments, the server retrieves the content on web page "www.example.com" and looks up associated compliance information based on the retrieved content information. For example, each content object may have a content object ID or fingerprint that may be used to identify it and look up usage rules associated with it. In some embodiments, both the URL "www.example.com" and information associated with the content object (such as a content object ID) are used to obtain the compliance information.

At 299, a web page with the compliance information is returned. At 294, the web page with the compliance information is viewed. For example, the potential content user views the compliance information and can decide whether to use the content.

Figure 3:
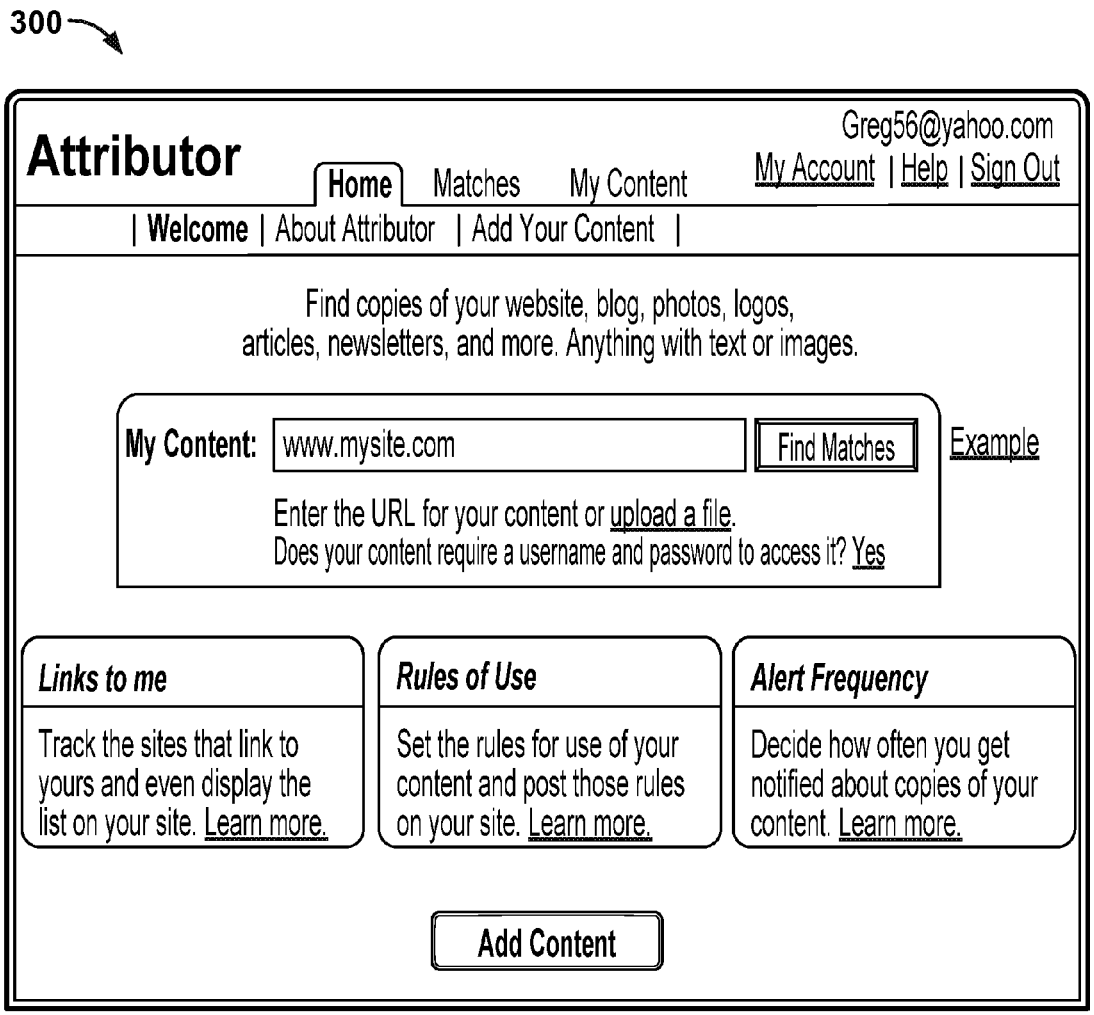
FIG. 3 is an example of a graphical user interface (GUI) for providing controlled content.

FIG. 3 is an example of a graphical user interface (GUI) for providing controlled content. In some embodiments, a user uses GUI 300 to specify content to be monitored at 202. As shown, a user can enter a URL or a link to controlled content or upload a file. Any number of content objects can be specified. A username and password to access content can be provided. In some embodiments, a user uses GUI 300 to specify input to ingestor 104 in FIG. 1.

GUI 300 and the other GUIs described herein may vary depending on the embodiment. Which functionality to include and how to present the functionality may vary. For example, which objects (e.g., text, links, input boxes, buttons, etc.) to include and where to place the objects may vary depending on the implementation.

FIG. 4A is an example of a GUI for providing controlled content. In some embodiments, GUI 400 opens in response to selecting a link in GUI 300, such as the "Add Content" button. In some embodiments, a user uses GUI 400 to specify content to be monitored at 202. In some embodiments, a user uses GUI 400 to specify input to ingestor 104 in FIG. 1.

As shown, one or more files may be provided in the "My content" input box. A user can indicate whether the content is a single web page or file or a URL or feed. In the case of the URL or feed, the content includes all existing content plus any new content added in the future. In the "Nickname" input box, the user can specify a nickname for the controlled content. In this way, a user can manage or maintain multiple sets of controlled content using different nicknames.

In some embodiments, a "Sites to watch" input box is provided, in which the user may enter URLs where the user expects the content to appear. For example, the user may currently be aware that a particular site is using the user's content. In some embodiments, the content monitoring system searches the web, but searches the specified sites first or more frequently.

In some embodiments, a "Related Keywords" input box is shown, in which, the user may enter keywords associated with the specified controlled content. For example, if the user expects the content to be found primarily in children's websites, the keywords "kids" and "children" might be included. In some embodiments, the content monitoring system automatically determines keywords (such as unique phrases) to search in addition to the related keywords specified by the user.

In some embodiment, a "Search Scope" input box, is shown, in which the user may specify whether the entire Internet should be searched or only domains specified by the user. In some embodiments, the user may specify to only search sites that copy the most often.

In some embodiments, a "Text" input box is provided, in which text may be entered. The text may be text in the content itself or text associated with the content, such as keywords, tags, depictions of the text (e.g., a photo of a street sign with text), etc. In addition, other search criteria may be specified, including a minimum similarity score, a minimum non-compliance score, a minimum percent of controlled content copied, a minimum percent of text copied, a minimum number of images copied, a minimum percent of match, whether the content is attributed (e.g., to the content owner), whether there is advertising on the page and what type, the minimum number of unique visitors per month, and what types of matches to find (e.g., images only, text only, video only, or combinations, etc.)

FIG. 4B is an example of a GUI for providing usage rules. In some embodiments, GUI 402 is included as part of GUI 400. In some embodiments, GUI 402 opens in response to selecting a link in GUI 400, such as a "Specify Rules of Use" link (not shown in GUI 400). In some embodiments, a user uses GUI 402 to specify usage rules associated with the content specified in GUI 400. In some embodiments, a user uses GUI 402 to specify usage rules at 203.

As shown, a list of usage rules may be selected by selecting bullets and checkboxes. The rules listed in this example include: attribution required/not required; commercial use OK, OK if user shares a specified percentage of the revenue, or no commercial use; limit text copies to a specified percentage of the source (controlled) content; no changes may be made to controlled content; contact content owner first for permission; share alike; a specified Creative Commons license; all rights reserved; or public domain.

Graphical icons are displayed next to each usage rule. For example, "$%" indicates that commercial use is okay if the user shares a specified percentage of the revenue. "By" with a slash through it indicates that attribution is not required. "%" indicates that text copied must be limited to a specified percentage of the controlled content.

A similar GUI may be used to specify host rules for a host policy.

FIG. 5 is an example of a GUI for displaying search results. In some embodiments, GUI 500 is used to report search results at 214, e.g., to a content owner. In some embodiments, reporter 110 in FIG. 1 reports results using GUI 500.

In the example shown, a content owner owns a collection of photography related content, including images of cameras and text descriptions of cameras. The search results are shown in a grid based layout. In each grid cell, a controlled content object and a match content object are shown, where it has been determined that the match content object is similar to the controlled content object based on a similarity score and a non-compliance score. As shown, in grid cell 502, the controlled image (camera1) and the match image (camera2) have a similarity score of 98 and a non-compliance score of 88. In some embodiments, data displayed includes one or more of the following: similarity score, non-compliance score, URL of the match content object, percent of the controlled object copied, percent of the controlled text copied, the number of controlled images copied, the date found, whether there is advertising on the page, etc. In the case of text, a portion of the copied text is displayed along with the controlled text in grid cell 504.

In some embodiments, rather than or in addition to reporting a score, a binary flagging (e.g., "interesting" or not) is reported. For example, a score that aggregates similarity, non-compliance, and/or other factors into a combined/summary score may be displayed.

In some embodiments, if there is more than one matched content object, then the additional matched content objects are displayed using a 3D graphical effect indicating there are multiple pairs. Using forward and back arrows, the user can cycle through the various pairs. In some embodiments, the pairs are displayed in descending similarity score order.

Various other functionality may be provided in GUI 500. For example, the search results may be filtered and sorted in various ways using the "Showing" and "Sort by" pull down menus. Additional controlled content may be added in the "Controlled Content" input box, an email address may be entered for automatic notification (e.g., when more matches are found) in the "Email Address" input box, etc. Rather than use a grid based layout, other layouts may be used in other embodiments.

In the case of a content host monitoring for use of non-compliant content based on the host policy, an interface similar to interface 500 may be used to display resulting matches. For example, cell 502 may display a match with copyrighted content. Cell 504 may display a match with content associated with child pornography. For example, in place of text1 may be a known image that has been positively identified (either manually or automatically) as child pornography, and in place of text2 may be a new image that is being posted by a user to the content host. In this case, the known image in place of text1 may have been in a database of known non-compliant content, and the match determined as described at 264. In some cases, the new image is determined to be a match with child pornography based on an evaluation (e.g., 268) rather than a match with a content object in a database of known pornography. In this case, in place of text1, there may be no image displayed, or data related to the evaluation may be displayed instead.

Figure 6:
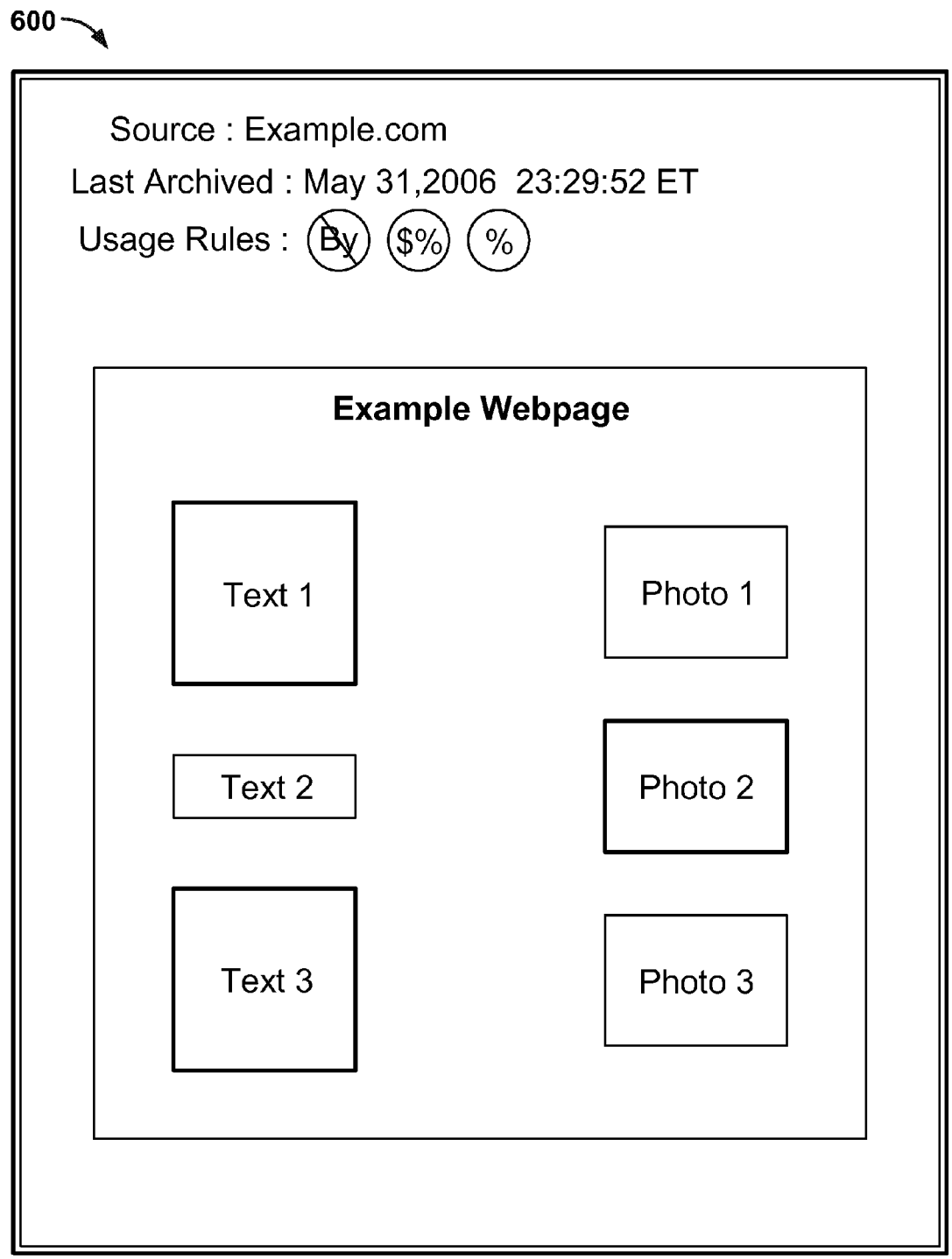
FIG. 6 is an example of a GUI for displaying use of a content object.

FIG. 6 is an example of a GUI for displaying use of a content object. In some embodiments, GUI 600 is displayed in response to selecting a "Match" link or the image or text corresponding to a match object in GUI 500.

In the example shown, the portions of the web page that include use of the controlled content are marked, i.e., boxed (e.g., a graphical box around the image or text that is being used). In this example, text1, text3, and photo2 are controlled content objects that are being used on this web page. In various embodiments, various indicators (e.g., visual cues) may be used to indicate the copied portions. Examples of indicators include: highlighting text, changing font appearance (e.g., using bold, underline, different fonts or font sizes, etc.), using different colors, displaying icons or other graphics in the vicinity of the copied portions, using time dependent indicators, such as causing the copied portions to flash, etc.

Various options or functionality may be provided for displaying information related to the use of the controlled content. For example, an archive date (May 31, 2006) may be displayed. Applicable usage rule(s) specified by the content owner may be displayed. In this case, the usage rules are displayed using the icons described with respect to FIG. 4B. When selecting an icon, details regarding the associated usage rule may be displayed.

In some embodiments, the web page shown is the current version of the web page. In some embodiments, the web page shown is an archived version. For example, the archived version may be stored in monitored content store 118. Whether the web page is the current version or an archived version may be indicated in the GUI. In addition, the user may be able to toggle between the two versions.

In some embodiments, a management GUI may be provided for managing content that provides links to one or more of the GUIs described above. In some embodiments, a user uses the management GUI to manage content, including add new controlled content, modify search parameters, report search results, etc. For example, various tabs may be provided, such as a "My Content" tab used to add/modify controlled content and search parameters and a "Matches" tab used to display search results. In some embodiments, selecting the "Matches" tab opens GUI 500.

A user can group content into categories, such as categories associated with the user's blog, camera reviews, the user's eBay account, and all files. In various embodiments, content may be grouped in folders, by tags, or in any other appropriate way. A list of controlled content (e.g., URLs, paths) associated with the category may be displayed, including the number of content objects associated with the controlled content, when the content objects were last archived (e.g., placed in controlled content store 116), rules associated with each content object, and the number of matches found for the content object(s).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of evaluating content, including:
   extracting features from a content object submitted by an owner of copyrighted content to obtain plural fingerprints for the content object, the plural fingerprints configured to assess extent of copying of the content object based on a similarity score;
   monitoring a network to obtain content hosted within the network;
   determining a host policy associated with one or more host policy rules, wherein the host policy specifies one or more conditions under which a content based on a copyrighted content may be hosted by a content host, wherein the one or more conditions include an usage rule specified by the owner of the copyrighted content, and wherein the usage rule specifies that use of the copyrighted content, including republication or modification of the copyrighted content, is permitted in a first context but not permitted in a second context;
   automatically assessing using a processor compliance with the one or more host policy rules based at least in part on a context associated with a use of the content, wherein the context comprises the extent of copying based on the similarity score and commercial hosting context, and the assessing comprises computing the similarity score using the plural fingerprints, and determining whether to enable ad revenue sharing between the content host and the owner based on a commercial use restriction in the usage rule;
   combining the compliance assessments to make a compliance evaluation based on a combination of the extent of copying and commercial use restriction.

2. The method as recited in claim 1, wherein the compliance evaluation includes a determination of whether the controlled content is compliant with the host policy.

3. The method as recited in claim 1, further including receiving the content and assessing compliance with the one or more host policy rules before allowing the content to be hosted.

4. The method as recited in claim 1, further including receiving the content and determining whether to allow the content to be hosted based on the compliance evaluation.

5. The method as recited in claim 1, further including rejecting the content based on the compliance evaluation.

6. The method as recited in claim 1, further including removing the content based on the compliance evaluation.

7. The method as recited in claim 1, further including removing the content if a response is not received from a user associated with the content.

8. The method as recited in claim 1, wherein one of the host policy rules prohibits hosting content associated with pornography.

9. The method as recited in claim 1, wherein one of the host policy rules prohibits hosting content associated with profanity.

10. The method as recited in claim 1, wherein one of the host policy rules prohibits hosting content that is considered objectionable.

11. The method as recited in claim 1, wherein the context includes a compliance factor.

12. The method as recited in claim 1, wherein assessing includes computing one or more non-compliance scores.

13. The method as recited in claim 1, wherein the context includes the presence or type of advertising.

14. The method as recited in claim 1, wherein the context includes the presence or type of attribution.

15. The method as recited in claim 1, wherein the context includes a technical factor.

16. The method as recited in claim 1, wherein the context includes reputation information.

17. The method as recited in claim 1, wherein assessing is based at least in part on a usage rule.

18. The method as recited in claim 1, wherein assessing is based at least in part on a host policy.

19. The method as recited in claim 1, wherein assessing is based at least in part on an Online Service Provider (OSP) policy.

20. The method as recited in claim 1, wherein assessing is based at least in part on a legal rule.

21. The method as recited in claim 1, wherein combining includes combining one or more non-compliance scores.

22. A system for evaluating content, including:
   one or more processors configured to:
   extract features from a content object submitted by an owner of copyrighted content to obtain plural fingerprints for the content object, the plural fingerprints configured to assess extent of copying of the content object based on a similarity score;
   monitor a network to obtain content hosted within the network;
   determine a host policy associated with one or more host policy rules, wherein the host policy specifies one or more conditions under which a content based on a copyrighted content may be hosted by a content host, wherein the one or more conditions include an usage rule specified by the owner of the copyrighted content, and wherein the usage rule specifies that use of the copyrighted content, including republication or modification of the copyrighted content, is permitted in a first context but not permitted in a second context;
   automatically assess using the one or more processors compliance with the one or more host policy rules based at least in part on a context associated with a use of the content, wherein the context comprises the extent of copying based on the similarity score and commercial hosting context, and using a processor to assess comprises computing the similarity score using the plural fingerprints, and determining whether to enable ad revenue sharing between the content host and the owner based on a commercial use restriction in the usage rule;
   combine the compliance assessments to make a compliance evaluation based on a combination of the extent of copying and commercial use restriction; and
   a memory coupled with the one or more processors, wherein the memory provides the one or more processors with instructions.

23. A non-transitory computer readable storage media on which is stored a computer program product for evaluating content, the computer program product comprising computer instructions for:
   extracting features from a content object submitted by an owner of copyrighted content to obtain plural fingerprints for the content object, the plural fingerprints configured to assess extent of copying of the content object based on a similarity score;

monitoring a network to obtain content hosted within the network;

determining a host policy associated with one or more host policy rules, wherein the host policy specifies one or more conditions under which a content based on a copyrighted content may be hosted by a content host, wherein the one or more conditions include an usage rule specified by the owner of the copyrighted content, and wherein the usage rule specifies that use of the copyrighted content, including republication or modification of the copyrighted content, is permitted in a first context but not permitted in a second context;

automatically assessing using a processor compliance with the one or more host policy rules based at least in part on a context associated with a use of the content, wherein the context comprises the extent of copying based on the similarity score and commercial hosting context, and the assessing comprises computing the similarity score using the plural fingerprints, and determining whether to enable ad revenue sharing between the content host and the owner based on a commercial use restriction in the usage rule;

combining the compliance assessments to make a compliance evaluation based on a combination of the extent of copying and commercial use restriction.

24. The method as recited in claim 1, further including contacting a user associated with the content.

25. A system for evaluating content, including:

a processor;

a memory having instructions that, when executed by the processor, causes the system to perform operations:

receiving electronic submission of a content object submitted by an owner of copyrighted content and analyzing the content object to obtain plural fingerprints for the content object, the plural fingerprints configured to assess extent of copying of the content object based on a similarity score;

searching a network to obtain content hosted within the network;

obtaining a host policy associated with one or more host policy rules, wherein the host policy specifies one or more conditions under which a content based on a copyrighted content may be hosted by a content host, wherein the one or more conditions include an usage rule specified by the owner of the copyrighted content, and wherein the usage rule specifies that use of the copyrighted content, including republication or modification of the copyrighted content, is permitted in a first context but not permitted in a second context;

automatically determining compliance with the one or more host policy rules based at least in part on a context associated with a use of the content, wherein the context comprises the extent of copying based on the similarity score using the plural fingerprints and commercial hosting context; and evaluating the compliance assessments to make a compliance evaluation based on a combination of the extent of copying and commercial use restriction and determining whether to enable ad revenue sharing between the content host and the owner based on a commercial use restriction in the usage rule.

* * * * *